United States Patent
Ibrahim et al.

(10) Patent No.: US 12,550,070 B2
(45) Date of Patent: Feb. 10, 2026

(54) POWER REDUCTION TECHNIQUES FOR NON-TRANSPARENT UPLINK-MUTING

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Qian Zhang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 18/480,467

(22) Filed: Oct. 3, 2023

(65) Prior Publication Data

US 2025/0113304 A1    Apr. 3, 2025

(51) Int. Cl.
*H04W 52/14* (2009.01)
*H04W 72/23* (2023.01)

(52) U.S. Cl.
CPC ......... *H04W 52/146* (2013.01); *H04W 72/23* (2023.01)

(58) Field of Classification Search
CPC ............................. H04W 52/146; H04W 72/23
USPC ....................................................... 455/522
See application file for complete search history.

(56) References Cited

U.S. PATENT DOCUMENTS

| | | | |
|---|---|---|---|
| 2013/0182663 A1* | 7/2013 | Ji | H04W 52/367 370/329 |
| 2013/0343315 A1* | 12/2013 | Tiirola | H04W 72/542 370/329 |
| 2014/0003270 A1* | 1/2014 | Maltsev | H04W 52/34 370/252 |
| 2014/0133428 A1* | 5/2014 | Kazmi | H04W 28/04 370/329 |
| 2020/0154363 A1* | 5/2020 | Yang | H04W 24/08 |
| 2020/0351897 A1* | 11/2020 | Fakoorian | H04L 5/0096 |

* cited by examiner

*Primary Examiner* — Don N Vo
(74) *Attorney, Agent, or Firm* — Holland & Hart LLP

(57) ABSTRACT

Methods, systems, and devices for wireless communication are described. A user equipment (UE) may apply an uplink muting maximum power reduction (UM-MPR) to uplink transmissions based on receiving an activation for uplink muting (e.g., activation of a muting pattern). The UE may apply the UM-MPR to an uplink transmission associated with a first muting pattern based on the first muting pattern being from a set of muting patterns, or from a subset of the set of muting patterns. In some examples, the UE may identify a value of the UM-MPR for the uplink transmission based on the first uplink muting pattern applied to the uplink transmission, a waveform type of the uplink transmission, a modulation scheme of the uplink transmission, a type of uplink resource allocation of the uplink transmission, or any combination thereof.

30 Claims, 16 Drawing Sheets

POWER REDUCTION TECHNIQUES FOR NON-TRANSPARENT UPLINK-MUTING

FIELD OF TECHNOLOGY

The following relates to wireless communications, including power reduction techniques for non-transparent uplink-muting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UEs).

SUMMARY

The described techniques relate to improved methods, systems, devices, and apparatuses that support power reduction techniques for non-transparent uplink-muting. For example, the described techniques may provide for a user equipment (UE) to apply an uplink muting maximum power reduction (UM-MPR) (e.g., a power reduction value) to transmissions of uplink signaling based on an activation of uplink muting (e.g., uplink resource muting). For example, the UE may apply a UM-MPR to transmissions of uplink signaling for a set of uplink muting patterns (e.g., non-transparent muting patterns, muting patterns defined in a standard, muting patterns supported by the UE, or any combination thereof). That is, the UE may apply a UM-MPR to a transmission of uplink signaling based on the uplink signaling being associated with an uplink muting pattern from the set of muting patterns. Additionally, or alternatively, the UE may apply a UM-MPR to transmissions of uplink signaling for a subset of the set of uplink muting patterns. That is, the UE may apply a UM-MPR to a transmission of uplink signaling based on the uplink signaling being associated with an uplink muting pattern from the subset of the set of muting patterns. In some cases, the UE may identify a value of the UM-MPR to apply to a transmission of the uplink signaling based on an uplink muting pattern associated with the uplink signaling, a waveform type of the uplink signaling, a modulation scheme of the uplink signaling, a type of uplink resource allocation associated with the uplink signaling, or any combination thereof.

A method for wireless communication by a UE is described. The method may include receiving control signaling indicating a configuration of an uplink muting pattern, the uplink muting pattern including one or more resources for which the UE mutes uplink transmissions, receiving a message triggering transmission of one or more uplink signals via a set of uplink resources, where the set of uplink resources at least partially overlaps with the one or more resources of the uplink muting pattern, and transmitting, via the set of uplink resources, the one or more uplink signals in accordance with the received message, where a threshold transmit power for transmitting the one or more uplink signals is based on a power reduction value associated with the uplink muting pattern.

A UE for wireless communications is described. The UE may include at least one processor and at least one memory coupled with the at least one processor, with instructions stored in the at least one memory. The instructions may be executable by the at least one processor, individually or in any combination, to cause the UE to receive control signaling indicating a configuration of an uplink muting pattern, the uplink muting pattern including one or more resources for which the UE mutes uplink transmissions, receive a message triggering transmission of one or more uplink signals via a set of uplink resources, where the set of uplink resources at least partially overlaps with the one or more resources of the uplink muting pattern, and transmit, via the set of uplink resources, the one or more uplink signals in accordance with the received message, where a threshold transmit power for transmitting the one or more uplink signals is based on a power reduction value associated with the uplink muting pattern.

Another UE for wireless communications is described. The UE may include means for receiving control signaling indicating a configuration of an uplink muting pattern, the uplink muting pattern including one or more resources for which the UE mutes uplink transmissions, means for receiving a message triggering transmission of one or more uplink signals via a set of uplink resources, where the set of uplink resources at least partially overlaps with the one or more resources of the uplink muting pattern, and means for transmitting, via the set of uplink resources, the one or more uplink signals in accordance with the received message, where a threshold transmit power for transmitting the one or more uplink signals is based on a power reduction value associated with the uplink muting pattern.

A non-transitory computer-readable medium storing code for wireless communications is described. The code may include instructions executable by at least one processor to receive control signaling indicating a configuration of an uplink muting pattern, the uplink muting pattern including one or more resources for which the UE mutes uplink transmissions, receive a message triggering transmission of one or more uplink signals via a set of uplink resources, where the set of uplink resources at least partially overlaps with the one or more resources of the uplink muting pattern, and transmit, via the set of uplink resources, the one or more uplink signals in accordance with the received message, where a threshold transmit power for transmitting the one or more uplink signals is based on a power reduction value associated with the uplink muting pattern.

Some examples of the method, UEs, and non-transitory computer-readable medium described herein may further include operations, features, means, or instructions for calculating the threshold transmit power of the one or more uplink signals based on the power reduction value, where the power reduction value may be associated with a set of uplink muting patterns that includes the uplink muting pattern.

In some examples of the method, UEs, and non-transitory computer-readable medium described herein, the set of uplink muting patterns includes at least one uplink muting pattern configured with one or more resource blocks (RBs) as the one or more resources for which the UE mutes the uplink transmissions.

In some examples of the method, UEs, and non-transitory computer-readable medium described herein, the set of uplink muting patterns includes at least one uplink muting pattern configured with one or more resource elements (REs) as the one or more resources for which the UE mutes the uplink transmissions.

In some examples of the method, UEs, and non-transitory computer-readable medium described herein, the set of uplink muting patterns includes a subset of a set of multiple uplink muting patterns.

In some examples of the method, UEs, and non-transitory computer-readable medium described herein, each uplink muting pattern of the set of uplink muting patterns may be associated with a respective power reduction value.

Some examples of the method, UEs, and non-transitory computer-readable medium described herein may further include operations, features, means, or instructions for identifying the power reduction value based on the uplink muting pattern, a waveform type associated with the one or more uplink signals, a modulation scheme associated with the one or more uplink signals, or any combination thereof.

In some examples of the method, UEs, and non-transitory computer-readable medium described herein, the power reduction value may be identified based on a lookup table that includes a set of multiple power reduction values associated with respective uplink muting patterns.

Some examples of the method, UEs, and non-transitory computer-readable medium described herein may further include operations, features, means, or instructions for identifying the power reduction value based on an allocation type of the set of uplink resources, where the allocation type includes an inner resource allocation or an outer resource allocation.

Some examples of the method, UEs, and non-transitory computer-readable medium described herein may further include operations, features, means, or instructions for identifying the power reduction value based on the uplink muting pattern and an allocation type of the set of uplink resources, where the allocation type includes an inner resource allocation or an outer resource allocation.

In some examples of the method, UEs, and non-transitory computer-readable medium described herein, the uplink muting pattern may be associated with cross-link interference mitigation for a network entity operating in a full duplex mode and the set of uplink resources may be associated with at least one full-duplex slot.

A method for wireless communication by a network entity is described. The method may include transmitting control signaling indicating a configuration of an uplink muting pattern, the uplink muting pattern including one or more resources for which a UE mutes uplink transmissions, transmitting a message triggering transmission of one or more uplink signals via a set of uplink resources, where the set of uplink resources at least partially overlaps with the one or more resources of the uplink muting pattern, and receiving, via the set of uplink resources, the one or more uplink signals in accordance with the transmitted message, where a transmit power of at least one of the one or more uplink signals is based on a power reduction value associated with the uplink muting pattern.

A network entity for wireless communications is described. The network entity may include at least one processor and at least one memory coupled with the at least one processor, with instructions stored in the at least one memory. The instructions may be executable by the at least one processor, individually or in any combination, to cause the network entity to transmit control signaling indicating a configuration of an uplink muting pattern, the uplink muting pattern including one or more resources for which a UE mutes uplink transmissions, transmit a message triggering transmission of one or more uplink signals via a set of uplink resources, where the set of uplink resources at least partially overlaps with the one or more resources of the uplink muting pattern, and receive, via the set of uplink resources, the one or more uplink signals in accordance with the transmitted message, where a transmit power of at least one of the one or more uplink signals is based on a power reduction value associated with the uplink muting pattern.

Another network entity for wireless communications is described. The network entity may include means for transmitting control signaling indicating a configuration of an uplink muting pattern, the uplink muting pattern including one or more resources for which a UE mutes uplink transmissions, means for transmitting a message triggering transmission of one or more uplink signals via a set of uplink resources, where the set of uplink resources at least partially overlaps with the one or more resources of the uplink muting pattern, and means for receiving, via the set of uplink resources, the one or more uplink signals in accordance with the transmitted message, where a transmit power of at least one of the one or more uplink signals is based on a power reduction value associated with the uplink muting pattern.

A non-transitory computer-readable medium storing code for wireless communications is described. The code may include instructions executable by at least one processor to transmit control signaling indicating a configuration of an uplink muting pattern, the uplink muting pattern including one or more resources for which a UE mutes uplink transmissions, transmit a message triggering transmission of one or more uplink signals via a set of uplink resources, where the set of uplink resources at least partially overlaps with the one or more resources of the uplink muting pattern, and receive, via the set of uplink resources, the one or more uplink signals in accordance with the transmitted message, where a transmit power of at least one of the one or more uplink signals is based on a power reduction value associated with the uplink muting pattern.

In some examples of the method, network entities, and non-transitory computer-readable medium described herein, the power reduction value may be associated with a set of uplink muting patterns that includes the uplink muting pattern.

In some examples of the method, network entities, and non-transitory computer-readable medium described herein, the set of uplink muting patterns includes at least one uplink muting pattern configured with one or more RBs as the one or more resources for which the UE mutes the uplink transmissions.

In some examples of the method, network entities, and non-transitory computer-readable medium described herein, the set of uplink muting patterns includes at least one uplink muting pattern configured with one or more REs as the one or more resources for which the UE mutes the uplink transmissions.

In some examples of the method, network entities, and non-transitory computer-readable medium described herein, the set of uplink muting patterns includes a subset of a set of multiple uplink muting patterns.

In some examples of the method, network entities, and non-transitory computer-readable medium described herein, each uplink muting pattern of the set of uplink muting patterns may be associated with a respective power reduction value.

In some examples of the method, network entities, and non-transitory computer-readable medium described herein, the power reduction value may be based on the uplink muting pattern, a waveform type associated with the one or more uplink signals, a modulation scheme associated with the one or more uplink signals, or any combination thereof.

In some examples of the method, network entities, and non-transitory computer-readable medium described herein, the power reduction value may be based on a lookup table that includes a set of multiple power reduction values associated with respective uplink muting patterns.

In some examples of the method, network entities, and non-transitory computer-readable medium described herein, the power reduction value may be based on an allocation type of the set of uplink resources and the allocation type includes an inner resource allocation or an outer resource allocation.

In some examples of the method, network entities, and non-transitory computer-readable medium described herein, the power reduction value may be based on the uplink muting pattern and an allocation type of the set of uplink resources and the allocation type includes an inner resource allocation or an outer resource allocation.

In some examples of the method, network entities, and non-transitory computer-readable medium described herein, the uplink muting pattern may be associated with cross-link interference mitigation for the network entity operating in a full duplex mode and the set of uplink resources may be associated with at least one full-duplex slot.

DETAILED DESCRIPTION

Figure 1:
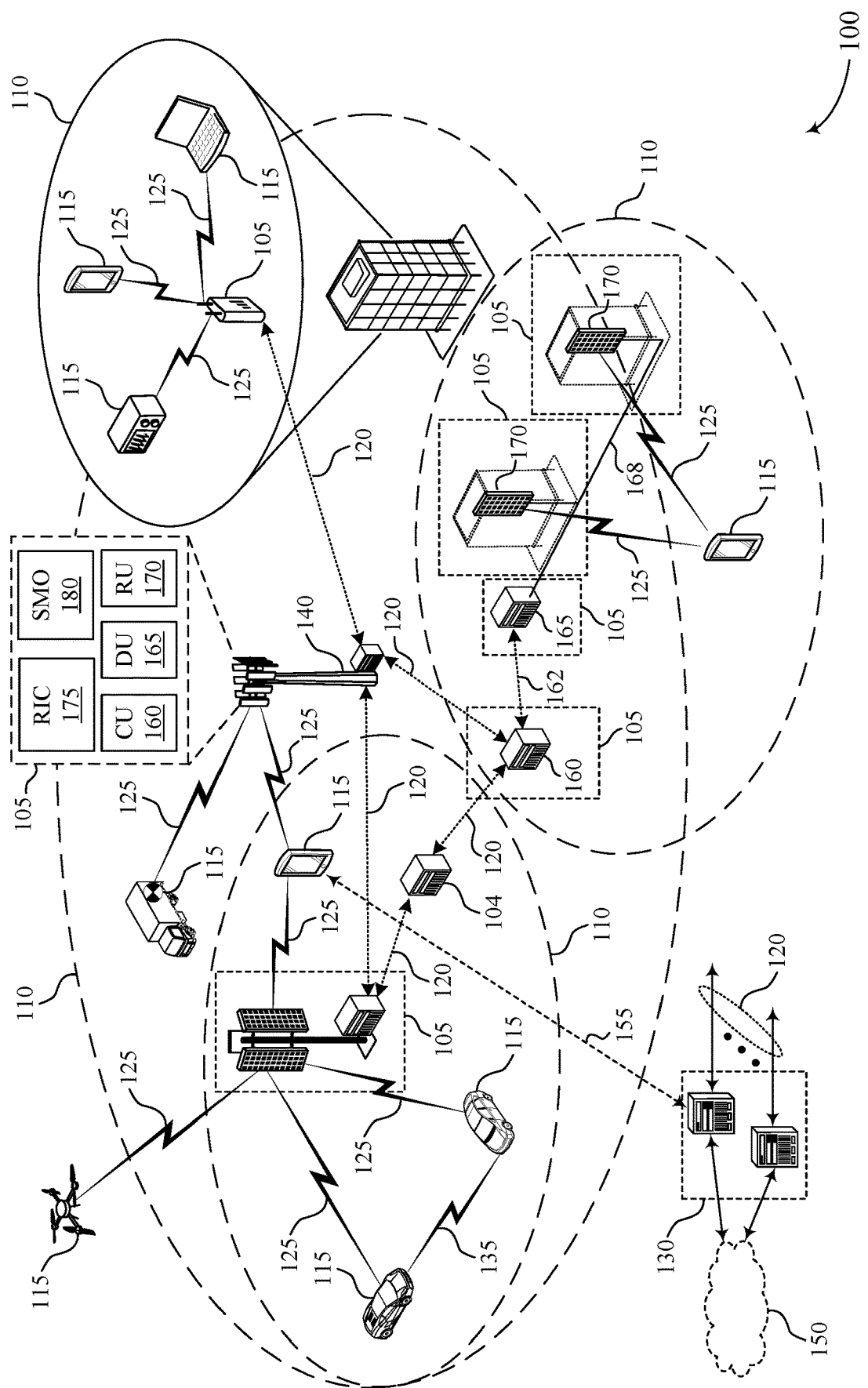
FIG. 1 shows an example of a wireless communications system that supports power reduction techniques for non-transparent uplink-muting in accordance with one or more aspects of the present disclosure.

Some wireless communications systems (e.g., full duplex wireless communications systems) may implement uplink muting (e.g., uplink resource muting) to allow for measurement of cross-link interference (CLI) (e.g., between different network entities, with a same network entity, or between a network entity and a user equipment (UE)) on an uplink resource with relatively less interference from uplink signaling on other uplink resources (e.g., as compared to performing measurements of CLI without uplink muting). The uplink muting may be transparent to a UE (e.g., implemented by a network entity and not known by or indicated to the UE) of the wireless communications system or non-transparent to the UE (e.g., the network entity indicates the uplink resource muting to the UE and the UE has information about the uplink muting). In some cases, a peak-to-average power ratio (PAPR) of uplink signaling that implements the uplink muting may be larger than otherwise desired (e.g., greater than a threshold) or permitted by emissions thresholds (e.g., requirements), leading to possible distortion (e.g., clipping) of the uplink signaling. In some cases, a maximum power reduction (MPR) may be applied to transmissions of uplink signaling to reduce an adjacent channel leakage ratio (ACLR) of edge band signaling (e.g., signaling that is transmitted via at least a first or a last frequency resource in a frequency bandwidth allocated for the uplink signaling), and to enable the transmission of the uplink signaling to satisfy the emissions thresholds (e.g., to be compliant with emission standards). However, a solution is desired to account for the increased PAPR (e.g., reduce the ACLR and comply with some emission standards) for uplink signaling associated with uplink resource muting.

According to techniques described herein, a UE may apply a power reduction (e.g., power reduction value) specific to uplink muting, which may be referred to as an uplink muting maximum power reduction (UM-MPR), to transmissions of uplink signaling (e.g., uplink transmissions) based on receiving an activation for uplink muting (e.g., uplink resource muting) for the uplink signaling (e.g., based on activation of uplink muting). In some examples, the UE may apply a UM-MPR to one or more transmissions of uplink signaling for a set of muting patterns (e.g., non-transparent muting patterns, muting patterns defined in a standard, muting patterns supported by the UE, or any combination thereof). For example, the UE may apply a UM-MPR to a transmission of uplink signaling based on the uplink signaling being associated with a muting pattern from the set of muting patterns. Additionally, or alternatively, the UE may apply a UM-MPR to one or more transmissions of uplink signaling for a subset of the set of muting patterns. For example, the UE may apply a UM-MPR to a transmission of uplink signaling based on the uplink signaling being associated with a muting pattern from the subset of the set of muting patterns. In some cases, the UE may identify a value of the UM-MPR to apply to a transmission of uplink signaling based on an uplink muting pattern associated with the uplink signaling, a waveform type of the uplink signaling, a modulation scheme of the uplink signaling, a type of uplink resource allocation (e.g., inner frequency resource allocation, an edge frequency resource allocation) associated with the uplink signaling, or any combination thereof.

Aspects of the disclosure are initially described in the context of wireless communications systems. Aspects of the disclosure are also described in the context of a process flow diagram. Aspects of the disclosure are further illustrated by and described herein with reference to apparatus diagrams, system diagrams, and flowcharts that relate to power reduction techniques for non-transparent uplink-muting.

FIG. 1 shows an example of a wireless communications system 100 that supports power reduction techniques for non-transparent uplink-muting in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support power reduction techniques for non-transparent uplink-muting as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element (RE) may refer to resources of one symbol period (e.g., a duration of one modulation symbol) and one subcarrier, in which case the symbol period and subcarrier spacing may be inversely related. The quantity of bits carried by each RE may depend on the modulation scheme (e.g., the order of the modulation scheme, the coding rate of the modulation scheme, or both), such that a relatively higher quantity of REs (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by)

the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

According to techniques described herein, a UE 115 may apply a UM-MPR (e.g., a power reduction value) to one or more transmissions of uplink signaling based on receiving an activation for uplink muting (e.g., uplink resource muting). In some examples, the UE 115 may apply a UM-MPR to one or more transmissions of uplink signaling for a set of uplink muting patterns. (e.g., non-transparent uplink muting patterns, muting patterns defined in a standard, muting patterns supported by the UE 115). That is, the UE 115 may apply a UM-MPR to a transmission of uplink signaling based on the uplink signaling being associated with an uplink muting pattern from the set of muting patterns. Additionally, or alternatively, the UE 115 may apply a UM-MPR to one or more transmissions of uplink signaling for a subset of the set of muting patterns. That is, the UE may apply a UM-MPR to a transmission of uplink signaling based on the uplink signaling being associated with an uplink muting pattern from the subset of the set of muting patterns. In some cases, the UE 115 may identify a value of the UM-MPR to apply to a transmission of uplink signaling based on an uplink muting pattern associated with the uplink signaling, a waveform type of the uplink signaling, a modulation scheme of the uplink signaling, a type of uplink resource allocation (e.g., inner frequency resource allocation, edge frequency resource allocation) associated with the uplink signaling, or any combination thereof.

Figure 2A:
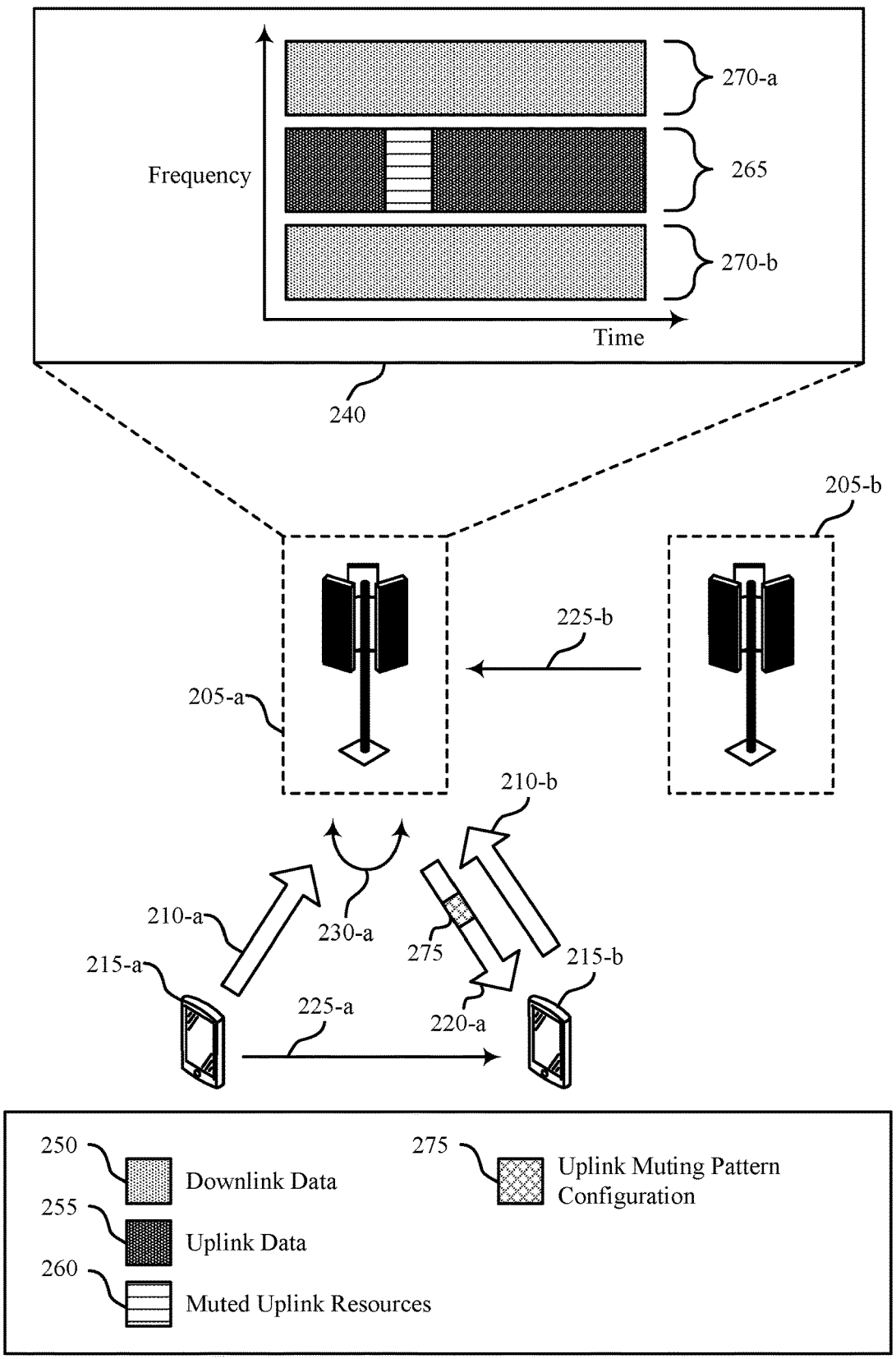
FIGS. 2A, 2B, and 2C each illustrate an example of a wireless communications system that supports power reduction techniques for non-transparent uplink-muting in accordance with one or more aspects of the present disclosure.
Figure 2B:
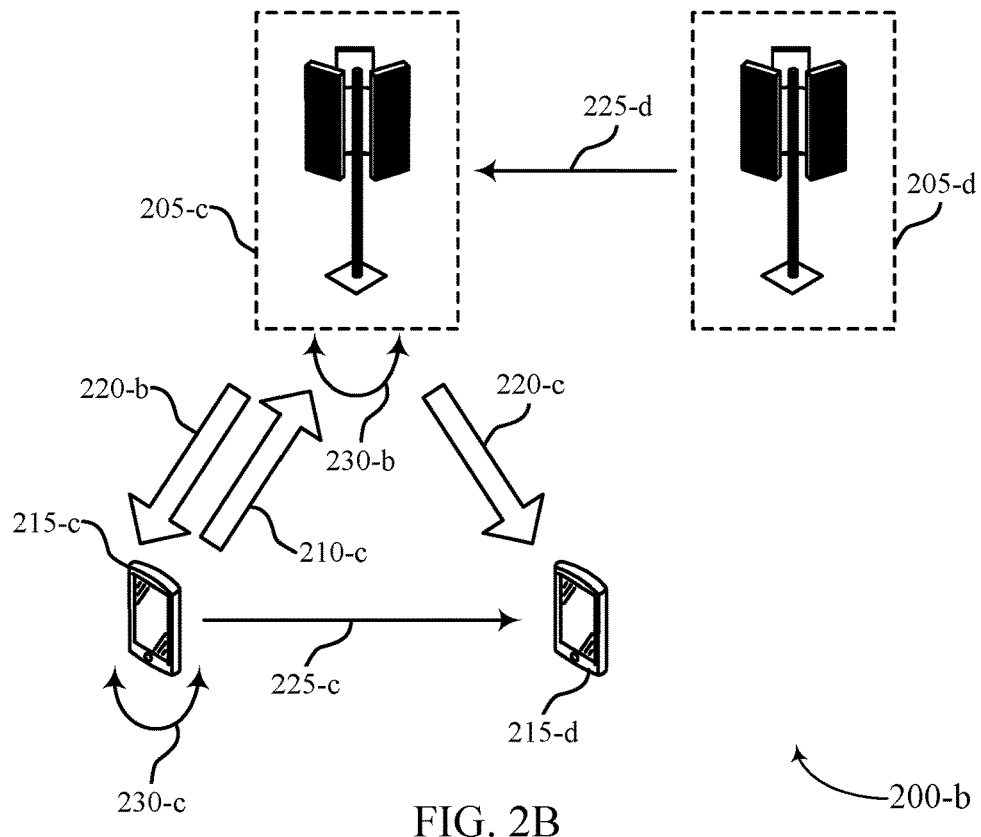
Figure 2C:
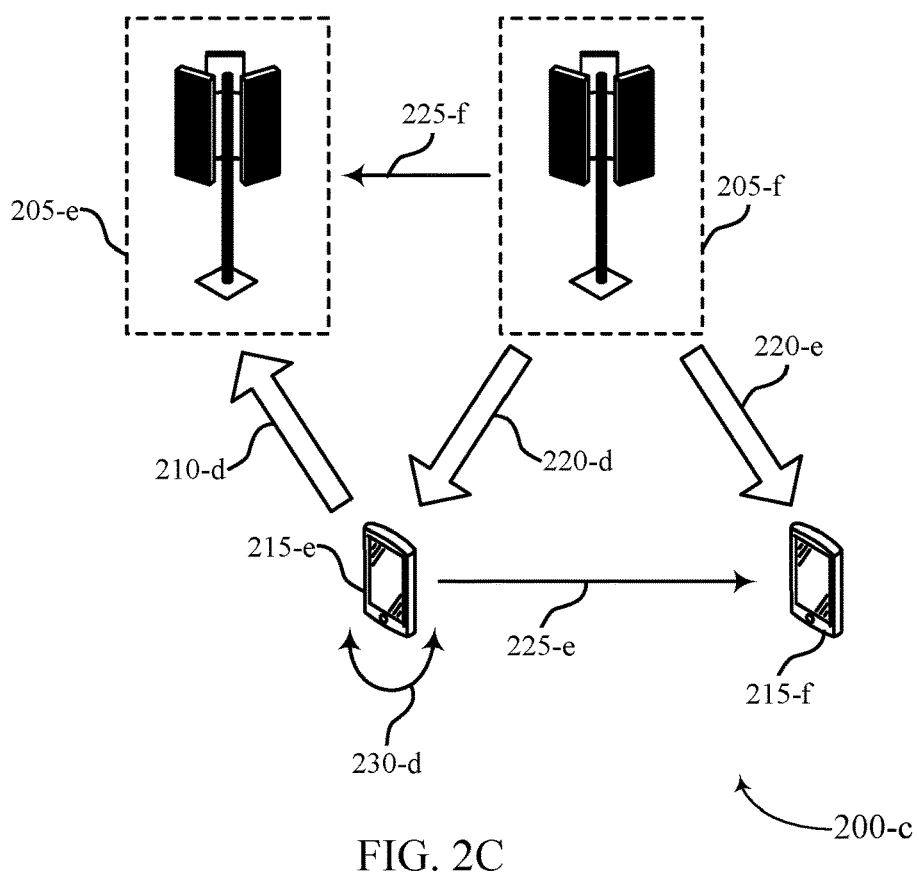

FIGS. 2A, 2B, and 2C each illustrate an example of a wireless communications system 200 that supports power reduction techniques for non-transparent uplink-muting in accordance with one or more aspects of the present disclosure. In some examples, the wireless communications systems 200 (e.g., a wireless communications system 200-a, a wireless communications system 200-b, and a wireless communications system 200-c) may implement aspects of the wireless communications system 100. For example, the wireless communications systems 200 may each include one or more network entities 205 (e.g., a network entity 205-a, a network entity 205-b, a network entity 205-c, a network entity 205-d, a network entity 205-e, and a network entity 205-f) and one or more UEs 215 (e.g., a UE 215-a, a UE 215-b, a UE 215-c, a UE 215-d, a UE 215-e, and a UE 215-f), which may be examples of the corresponding devices as described herein with reference to FIG. 1. In the example of FIGS. 2A, 2B, and 2C, the network entities 205 may be examples of a CU 160, a DU 165, an RU 170, a base station 140, an IAB node 104, or one or more other network nodes as described herein with reference to FIG. 1.

In the examples of FIGS. 2A, 2B, and 2C, the UEs 215 and the network entities 205 may communicate via one or more communication links 210 (e.g., a communication link 210-a, a communication link 210-b, a communication link 210-c, and a communication link 210-d) and via one or more communication links 220 (e.g., a communication link 220-a, a communication link 220-b, a communication link 220-c, a communication link 220-d, and a communication link 220-e). The communication links 210 may be examples of uplinks and the communication links 220 may be examples of downlinks. Additionally, or alternatively, the communication links 210 and the communication links 220 may each be examples of a communication link 125 as described herein with reference to FIG. 1. Each wireless communications system 200 may illustrate communication devices (e.g., one or more UEs 215, one or more network entities 205) operating in a full-duplex mode (e.g., performing full-duplex wireless communications) or a half-duplex TDD mode (e.g., performing half-duplex TDD wireless communications). That is, full-duplex (or half-duplex TDD) capabilities may be present at one or more network entities 205, one or more UEs 215, or both. For example, the wireless communications systems 200 may support TDD radio frequency bands (e.g., radio frequency spectrum bands configured for TDD communications), FDD radio frequency bands (e.g., radio frequency spectrum bands configured for FDD communications), full-duplex communications at one or more network entities 205 (and/or one or more UEs 215), half-duplex communications at one or more UE 215, or any combination thereof.

In some examples, time domain resources allocated for both downlink data 250 and uplink data 255 may be referred to as D+U slots (e.g., D+U symbols). In some examples, a D+U slot may include half-duplex symbols (e.g., downlink symbols or uplink symbols) or full-duplex symbols (e.g., both downlink symbols and uplink symbols). For example, some time resource (e.g., D+U slots) may be examples of slots in which a radio frequency band is used for both transmitting uplink communications (e.g., uplink transmissions) and transmitting downlink communications (e.g., downlink transmissions). In some examples, the uplink transmissions and the downlink transmissions may occur in overlapping bands (e.g., for in-band full duplex (IBFD) operations) or adjacent bands (e.g., for sub-band full duplex (SBFD) operations).

Each wireless communications system 200 may support multiple types of full-duplex operations. For example, a communication device operating within the wireless communications systems 200 (e.g., a network entity 205, a UE 215) may support IBFD operations, SBFD operations (e.g., frequency duplex operations), or both. In some examples of IBFD operations, the communication device may transmit and receive wireless communications on a same time and frequency resource (e.g., a same slot and component carrier bandwidth). For example, downlink communications and uplink communications may share time and frequency resources (e.g., IBFD time and frequency resources). In some examples, the time and frequency resources may partially overlap or fully overlap. Additionally, or alternatively, for SBFD operations, the communications device may transmit and receive communications at over a same time resource and one or more different frequency resources. That is, the downlink resources may be separated from the uplink resource in the frequency domain.

For SBFD operations in which uplink transmissions and downlink transmissions occur in adjacent bands, a half-duplex communication device may either transmit in an uplink radio frequency band or receive in a downlink radio frequency band. That is, for a given time domain resource (e.g., for a given D+U slot or a given D+U symbol), the half-duplex device (e.g., the UE 215-a, the UE 215-b) may transmit uplink data 255 (e.g., perform a PUSCH transmission) in an uplink radio frequency band 265 or receive downlink data 250 in a downlink radio frequency band 270 (e.g., or one or more downlink radio frequency bands 270). For example, the UE 215-a may transmit uplink data 255 in the uplink radio frequency band 265, while the UE 215-b receives downlink data 250 the downlink radio frequency band 270.

Additionally, or alternatively, for SBFD operations in which uplink and downlink transmissions occur in adjacent bands, a full-duplex device may transmit in the uplink radio frequency band 265 and receive in the downlink radio frequency band 270. That is, for a given time domain resource, the full-duplex device may transmit uplink data 255 (e.g., perform a PUSCH transmission) in an uplink radio frequency band 265 and receive downlink data 250 in a downlink radio frequency band 270.

In some examples, full-duplex communications may provide for latency reduction. For example, latency savings may be enabled by receiving downlink signal in uplink slots. Moreover, full-duplex communications may provide for spectrum efficiency enhancement (e.g., per cell or per UE), efficient resource utilization, and coverage extension, among other benefits. In some examples, however, full-duplex communications may lead to one or more types of interference, such as inter-cell interference (e.g., from neighboring communication devices), self-interference (e.g., for full-duplex communication devices), and CLI (e.g., inter-cell CLI or intra-cell CLI). For example, a communication device (e.g., one or more network entities 205, one or more UEs 215) may experience self-interference 230 (e.g., a self-interference 230-a, a self-interference 230-b, a self-interference 230-c, and a self-interference 230-d) between a pair of beams, such as a beam used for transmitting communications and a beam used die receiving communications. In some examples, self-interference may result from signal leakage between an antenna panel used to transmit communications and an antenna panel used to receive communications.

Additionally, or alternatively, neighboring communication devices (e.g., neighboring UEs 215, neighboring network entities 205) may perform full-duplex communications (or half-duplex TDD) concurrently, such that communications received by a first communication device may overlap in time with communications transmitted by a second communication device (e.g., a neighboring communication device). In such an example, the communications transmitted by the second communication device may interfere with the communications received at the first communication device. For example, the communications transmitted by the second communication device may lead to CLI at the first communications device. In some examples, CLI (e.g., CLI 225-a, CLI 225-b, CLI 225-c, CLI 225-d, CLI 225-e, CLI 225-f) may result from energy leakage due to timing and frequency unalignment (e.g., misalignment) between the neighboring communication devices.

In some examples, the network entity 205-a may be operating in a full-duplex mode (e.g., SBFD, IBFD) and the UEs 215 (e.g., the UE 215-a and the UE 215-b) may be operating in a half-duplex mode. For example, the network entity 205-a may receive uplink communications from the UE 215-a (e.g., via the communication link 210-a), while simultaneously transmitting downlink communications to a UE 215-b (e.g., via the communication link 220-a). In such an example, the full-duplex communications at the network entity 205-a may lead to self-interference 230-a. Additionally, or alternatively, the network entity 205-a and the network entity 205-b (e.g., neighboring network entities) may concurrently perform full-duplex communications, such that downlink signals transmitted by the network entity 205-b may overlap with uplink signals received by the network entity 205-a, leading to CLI 225-b.

Additionally, or alternatively, the UE 215-a and the UE 215-b (e.g., neighboring UEs) may concurrently perform half-duplex TDD communications such that uplink signals transmitted by the UE 215-b may overlap with downlink signals received by the UE 215-a, which may lead to CLI 225-a. In some examples, the UE 215-a may be operating in a cell different from the cell in which the UE 215-b may be operating. For example, the UE 215-a and the UE 215-b may be operating in adjacent cells. In an example, the CLI 225-a may be an example of inter-cell CLI. Additionally, or alternatively, the network entity 205-b may perform full-duplex communications concurrently with the network entity 205-a. In such an example, downlink communications transmitted by the network entity 205-b may lead to inter-cell interference at the UE 215-b. For example, the downlink communications transmitted by the network entity 205-b (e.g., to another UE (not shown)) may interfere with downlink communications received the UE 215-b (e.g., from the network entity 205-a).

In some other examples, the UE 215-a and the UE 215-b may be operating in a same cell. In such an example, the CLI 225-a may be an example of intra-cell CLI. For example, the network entity 205-a may be operating in a full-duplex mode (e.g., in SBFD), such that the network entity 205-a may configure downlink communications for the UE 215-a in frequency domain resources adjacent to the frequency domain resources allocated for uplink communications from the UE 215-b. For example, the network entity 205-a may configure the UE 215-b to receive downlink data 250 (e.g., from the network entity 205-a) in the downlink radio frequency band 270 and the UE 215-a may be configured to transmit uplink data 255 in the uplink radio frequency band 265 (e.g., the adjacent frequency resources). In such an example, the uplink communications transmitted by the UE 215-a may interfere with the downlink communications received at the UE 215-b.

In the example of FIG. 2B, the network entity 205-c and the UE 215-c may each be operating in a full-duplex mode (e.g., IBFD), such that the UE 215-c may receive downlink communications from the network entity 205-c via the communication link 220-b, while simultaneously transmitting uplink communications to the network entity 205-c via the communication link 210-c. In such an example, the full-duplex communications at the network entity 205-c and the full-duplex communications at the UE 215-c may lead to self-interference 230-b and self-interference 230-c, respectively. In some examples of the wireless communications system 200-b, the UE 215-c and the UE 215-d may each be operating in a multiple transmission and reception mode. In such an example, downlink communications and uplink communications performed by the network entity 205-c may occur at two different antenna panels located at two transmission and reception points. For example, the reception of uplink communications from the UE 215-c a may occur at an antenna panel of a first transmission and reception point and the transmission of downlink communications to the UE 215-c may occur at an antenna panel of a second transmission and reception point. In some other examples, reception of the uplink communications and transmission of the downlink communications may occur at two co-located antenna panels of the network entity 205-c (e.g., a single base station).

In the example of FIG. 2C, the UE 215-e may be operating in a full-duplex mode (e.g., SBFD), such that the UE 215-e may receive downlink communications from the network entity 205-f via the communication link 220-d, while simultaneously transmitting uplink communications to the network entity 205-e via the communication link 210-d. In such an example, the full-duplex communications at the UE 215-e may lead to self-interference 230-d. In some examples of the wireless communications system 200-c, the network entity 205-e and the network entity 205-f may be examples of transmission and reception points and the UE 215-e (e.g., and the UE 215-f) may be operating in a multiple transmission and reception mode. In such an example, the uplink communications transmitted from the UE 215-e may lead to CLI 225-e (e.g., intra-cell CLI) at the UE 215-f.

To enhance measurement of CLI 225 (e.g., as well as other interference and channel characteristics) in a wireless communications system (e.g., network entity co-channel CLI measurement, channel measurement, or both), devices in the wireless communications systems 200 may implement uplink muting. For example, the network entity 205-a may configure communications for the UE 215-a, the UE 215-b, or both, according to an uplink muting pattern 240. That is, the network entity 205-a may transmit, to the UE 215-b, an indication of one or more muted uplink resources 260 in the time domain (e.g., slots, symbols). For example, as depicted in FIG. 2A, the UE 215-b may be configured with one or more downlink resources in the downlink radio frequency bands 270-a (e.g., time domain resources for downlink data 250) and one or more downlink resources in the downlink radio frequency band 270-b (e.g., time domain resources for uplink data 255). Additionally, the UE 215-a may be configured with one or more uplink resources in the uplink radio frequency band 265. As such, the network entity 205-a may transmit, to the UE 215-b, an uplink muting pattern configuration 275 (e.g., control message) indicating one or more muted uplink resources 260 in the uplink radio frequency band 265, where the one or more muted uplink resources 260 overlap at least partially with the one or more uplink resources allocated to the UE 215-b.

The one or more downlink resources, one or more uplink resources, and one or more muted uplink resources 260 depicted in FIG. 2A are merely exemplary, and the techniques described herein allow for any quantity of resources, and in any pattern or combination. For example, the techniques described herein may support multiple sections, or sets, of muted uplink resources 260 within the uplink radio frequency band 265.

In some cases, the uplink muting may be transparent to one or more UEs 215 of the wireless communications systems 200. For example, the network entities 205 may avoid scheduling the UEs 215 on one or more uplink resources, effectively muting the one or more uplink resources and using the uplink resources for measurement. In some cases, the uplink muting may be non-transparent to one or more UEs 215 of the wireless communications systems 200. For example, one or more of the network entities 205 may indicate an uplink muting pattern 240 to one or more of the UEs 215, where the uplink muting pattern 240 may define, or indicate, one or more uplink resources (e.g., uplink time domain resources, uplink frequency domain resources) for uplink muting (e.g., indicating the one or more UEs 215 to not transmit on the one or more muted uplink resources 260). In some cases, the uplink muting pattern 240 may be a RE muting pattern (e.g., indicating one or more REs for uplink muting), a resource block (RB) muting pattern (e.g., indicating one or more RBs for uplink muting), or both.

In some cases (e.g., for CLI measurements between network entities 205), uplink muting may enable devices in the wireless communications systems 200 to perform channel measurements on the one or more muted uplink resources 260 with relatively less interference from uplink transmissions on the non-muted uplink resources (e.g., as compared to without uplink muting). For example, a device of the wireless communications systems 200 may perform CLI measurements, channel measurements, interference covariance matrix measurements, or any combination thereof, during the muted uplink resources 260. However, in some cases, the uplink muting may decrease communications performance in the wireless communications systems 200, for example, by decreasing the resources available for uplink transmissions from the UEs 215.

Additionally, or alternatively, uplink muting (e.g., non-transparent uplink muting) may affect (e.g., increase) a peak-to-average power ratio (PAPR) associated with uplink transmissions on the non-muted uplink resources. For example, a UE 215 implementing uplink muting may transmit one or more non-contiguous uplink transmissions, which may include the UE 215 alternating between modes of transmitting and not transmitting. In such examples, the alternating between modes may cause an effect on the one or more non-contiguous uplink transmissions, where the effect may include an increased PAPR associated with the one or more non-contiguous uplink transmissions.

In some wireless communications systems, a UE 215 may utilize an uplink MPR to comply with general emissions thresholds (e.g., ACLR, spectrum emission mask (SEM), spurious emissions, in-band emissions, error vector magnitude (EVM)). In some cases, the UE 215 may utilize the uplink MPR to reduce an output power (e.g., the maximum output power, transmit power) of a transmission of uplink signaling, for example, due to higher order modulations associated with the uplink signaling, transmit bandwidth configurations associated with the uplink signaling, or both. For example, the UE 215 may reduce a threshold transmit power, or threshold output power, for transmitting the uplink signaling by a value of the uplink MPR.

The UE 215 may determine the uplink MPR based on one or more factors. For example, the UE 215 may determine the uplink MPR based on whether the uplink signaling is transmitted via DFT-S-OFDM (e.g., or signal carrier frequency division multiple access (SC-FDMA)) symbols or cyclic prefix OFDM (CP-OFDM) symbols, based on a modulation scheme associated with the uplink signaling, based on an uplink resource allocation associated with the uplink signaling (e.g., inner allocation vs. outer allocation), or any combination thereof. For example, the UE 215 may determine the uplink MPR based on whether the uplink resource allocation for the uplink signaling includes one or more inner resource allocations (e.g., frequency resource allocations that may exclude the first and last frequency resources of an allocated frequency bandwidth for the uplink signaling), an edge resource allocation (e.g., frequency resource allocations that may include the first and last frequency resources of an allocated frequency bandwidth for the uplink signaling), or both. In some cases, the UE 215 may determine the uplink MPR without considering a bandwidth associated with a channel for transmitting the uplink signaling, a subcarrier spacing (SCS) associated with the channel, or both.

As described herein, in some wireless communications systems, a UE 215 may consider an uplink resource allocation associated with transmitting uplink signaling to determine an uplink MPR associated with the uplink signaling. For example, for smaller uplink resource allocations (e.g., less time domain resources) located in the middle of a channel (e.g., excluding frequency domain edge-band resources), the UE 215 may determine to utilize, or apply, a smaller MPR (e.g., as compared to larger resource allocations, resources allocations at edges of the channel, or both), for example, because smaller uplink resource allocations located in the middle of the channel may not be impacted by ACLR, SEM, and spurious emissions. Additionally, or alternatively, for larger uplink resource allocations, uplink resource allocations located near the edge of the channel, or both, the UE 215 may determine to utilize a larger MPR (e.g., as compared to smaller resource allocations, resources allocations in the middle of the channel, or both), for example, because larger uplink resource allocations, uplink resource allocations located near the edge of the channel, or both, may be impacted by ACLR, SEM, and spurious emissions. In some cases, an uplink resource allocation may be an edge uplink resource allocation if the uplink resource allocation includes an uppermost resource of the channel, a lowermost resource of the channel, or both, and the uplink resource allocation has a length of contiguous resource blocks (LCRB) of two or less.

In some cases, the uplink signaling may be associated with a high order modulation. In such cases, an EVM associated with the uplink signaling, in-band emissions associated with the uplink signaling, or both, may be greater than other emissions associated with the uplink resource allocation (e.g., ACLR, EVM, spurious emissions). In such cases, the UE 215 may determine the uplink MPR based on the EVM, the in-band emissions, or both.

In some cases, a UE 215 may receive additional emission threshold (e.g., requirements) from a network entity 205. In such cases, the UE 215 may utilize an additional maximum power reduction (A-MPR) in order to comply with the additional emission thresholds. For example, each additional emission threshold may be associated with a unique network signaling (NS) value, which may be indicated in RRC signaling by an NR frequency band number of an applicable operating band and an associated value in a field (e.g., additionalSpectrumEmission). In some cases, the UE 215 may utilize an A-MPR for each additional emission threshold, such that each additional emission threshold may correspond to one or more A-MPRs. Additionally, or alternatively, the UE 215 may autonomously configure, or determine, an output power threshold (e.g., $P_{c,max,f,c}$) for a carrier, f, of a serving cell, c, in each slot, where the UE 215 may configure a threshold (e.g., maximum) output power within an upper (e.g., maximum) bound and a lower (e.g., minimum) bound.

In some cases, different uplink muting (e.g., blank, rate matched) resources 260 may be used to measure spatial characteristics of CLI 225 between one or more network entities, as the CLI 225 may be caused by various downlink signals and the muted uplink resources 260 may avoid CLI 225 over the muted uplink resources 260. In some cases, a UE 215 may apply different uplink muting patterns 240 for different downlink channels, downlink signal, or both.

For example, to enhance measurement of CLI 225 (e.g., co-channel CLI measurement) between network entities, a UE 215 may support uplink muting for REs associated with downlink transmissions of one or more synchronization signal blocks (SSBs), system information blocks (SIBs) (e.g., SIB1), broadcast PDCCH (e.g., from an aggressor cell, or cell causing the CLI 225), or any combination thereof. Additionally, or alternatively, to obtain (e.g., measure) spatial characteristics associated with downlink channels (e.g., a unicast PDSCH, PDCCH CLI), the UE 215 may support uplink muting for REs associated with unicast PDSCH, PDCCH (e.g., from an aggressive cell), or both. Additionally, or alternatively, to avoid relatively high instances of CLI 225, the UE 215 may support uplink muting for REs associated with non-zero power channel state information reference signals (NZP CSI-RS) (e.g., from an aggressor cell).

In some cases, implementation of uplink muting (e.g., non-transparent uplink muting) to enhance measurement of CLI 225 between network entities 205 may increase PAPR of uplink signaling. In some cases, a UE 215 may utilize one or more MPRs (e.g., uplink MPR, A-MPR) to compensate for the increased PAPR of the uplink signaling and assist the UE 215 in complying with emission thresholds (e.g., requirements). Additionally, or alternatively, the UE 215 may experience relatively increased non-linearity from a power amplifier (PA) of the UE 215 due to the increased PAPR. In some cases, the UE 215 may avoid such increased non-linearity of the PA by reducing a transmit power of the uplink signaling, utilizing a PAPR reduction technique, or both, which may increase the EVM associated with the uplink signaling.

According to techniques described herein, a UE 215 may apply a UM-MPR (e.g., a power reduction value, power reduction specific to uplink muting) to transmissions of uplink signaling (e.g., uplink transmissions) based on receiving an activation for uplink muting (e.g., uplink resource muting) for the uplink signaling (e.g., based on activation of uplink muting). That is, the UE 215 may apply a UM-MPR to a transmission of uplink signaling based on receiving an uplink muting configuration 275 indicating one or more muted uplink resources 260, where the one or more muted uplink resources 260 overlap at least partially with resources allocated for the uplink signaling.

For example, the UE 215 may apply a UM-MPR to transmissions of uplink signaling for a set of uplink muting patterns 240 (e.g., non-transparent muting patterns, muting patterns defined in a standard, muting patterns supported by the UE 215). That is, the UE 215 apply a UM-MPR to a transmission of uplink signaling based on the uplink signaling being associated with an uplink muting pattern 240 from the set of uplink muting patterns 240. In some examples, the UM-MPR may be associated with the specific uplink muting pattern 240 from the set of uplink muting patterns 240 (e.g., a UM-MPR may be defined for each uplink muting pattern 240 of the set of uplink muting patterns 240) or may be universal to the set of uplink muting patterns 240 (e.g., a single UM-MPR may be defined for the set of uplink muting patterns 240).

Additionally, or alternatively, the UE 215 may apply a UM-MPR to transmissions of uplink signaling for a subset of the set of muting patterns 240. That is, the UE may apply a UM-MPR to a transmission of uplink signaling based on the uplink signaling being associated with an uplink muting pattern 240 from the subset of the set of uplink muting patterns 240. In some examples, the UM-MPR may be associated with the specific uplink muting pattern 240 from the subset of the set of uplink muting patterns 240 (e.g., a UM-MPR may be defined for each uplink muting pattern 240 of the subset of the set of uplink muting patterns 240) or may be universal to the subset of the set of uplink muting patterns 240 (e.g., a single UM-MPR may be defined for the subset of the set of uplink muting patterns 240

In some cases, the UE 215 may identify the UM-MPR to apply to an uplink signaling based on an uplink muting pattern 240 associated with the uplink signaling, a waveform type (e.g., DFT-S-OFDM, CP-OFDM) of the uplink signaling, a modulation scheme (e.g., quadrature phase shift keying (QPSK), 256-quadrature amplitude modulation (QAM)) of the uplink signaling, a type of uplink resource allocation (e.g., inner frequency resource allocation, edge frequency resource allocation) associated with the uplink signaling, or any combination thereof.

Figure 3:
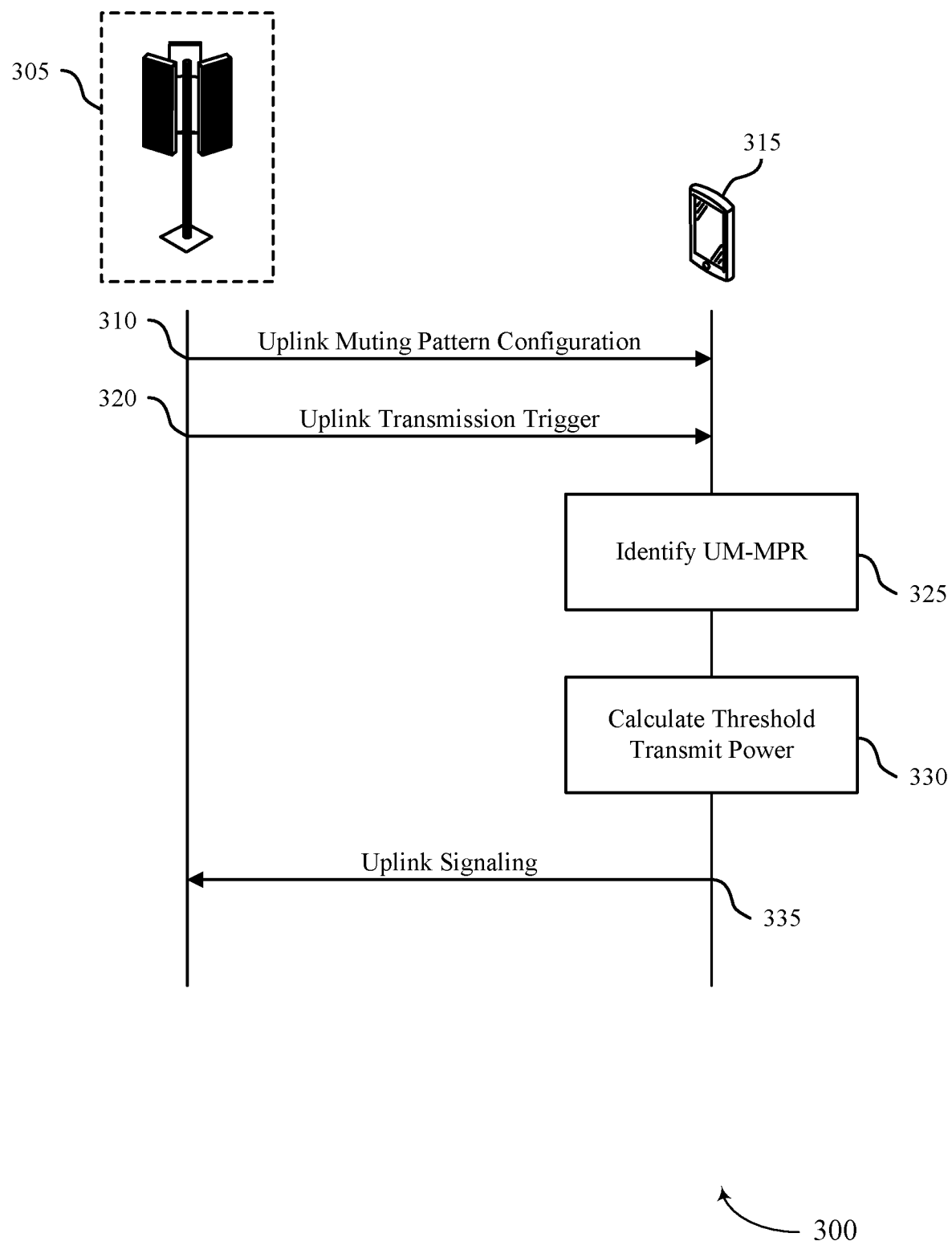
FIG. 3 shows an example of a process flow that supports power reduction techniques for non-transparent uplink-muting in accordance with one or more aspects of the present disclosure.

FIG. 3 shows an example of a process flow 300 that supports power reduction techniques for non-transparent uplink-muting in accordance with one or more aspects of the present disclosure. In some cases, aspects of the process flow 300 may implement or be implemented by aspects of FIGS. 1, 2A, 2B, and 2C. For example, the process flow 300 may include a network entity 305 and a UE 315. The network entity 305 may be an example of a network entity 105 and a network entity 205, as described herein with respect to FIGS. 1, 2A, 2B, and 2C. The UE 315 may be an example of a UE 115 and a UE 215, as described herein with respect to FIGS. 1, 2A, 2B, and 2C. In some cases, the UE 315 may apply a UM-MPR to network entity or more uplink transmissions (e.g., uplink signaling) with uplink muting based on receiving an activation for uplink muting from the network entity 305.

At 310, the UE 315 may receive control signaling (e.g., from the network entity 305) indicating a configuration of an uplink muting pattern, where the uplink muting pattern includes one or more resources for which the UE may mute uplink transmissions. For example, the UE 315 may be associated with a set of resources (e.g., an RB, multiple RBs) over which the UE 315 may transmit uplink signaling, and the uplink muting pattern may indicate one or more resources of the set of resources for the UE 315 to mute uplink signaling. In other words, the UE 315 may refrain from transmitting uplink signaling during the one or more resources that are muted (e.g., the one or more resources may not to be used by the UE 315 for uplink signaling). In some cases, the uplink muting pattern may be from a set of uplink muting patterns, where the set of uplink muting patterns may include at least one uplink muting pattern configured with one or more RBs as the one or more resources for which the UE 315 mutes the uplink transmissions. Additionally, or alternatively, the set of uplink muting patterns may include at least one uplink muting pattern configured with one or more REs as the one or more resources for which the UE 315 mutes the uplink transmissions.

In some cases, the uplink muting pattern may be associated with CLI mitigation for the network entity 305. For example, the network entity 305 may operate in a full duplex mode, and may experience CLI with itself or other network entities (e.g., network entities 205, network entities 105) as described herein with respect to FIGS. 1, 2A, 2B, and 2C.

At 320, the UE 315 may receive a message (e.g., an uplink transmission trigger, uplink transmission grant, uplink transmission request) triggering a transmission of one or more uplink signals via a set of uplink resources, where the set of uplink resources may at least partially overlap with the one or more resources of the uplink muting pattern. In some cases, the set of uplink resources may be associated with at least one full-duplex slot, as described herein with respect to FIGS. 2A, 2B, and 2C.

At 325, the UE 315 may identify a UM-MPR (e.g., power reduction value) to apply to the transmission of the one or more uplink signals. The UM-MPR may be different from the uplink MPR, the A-MPR, or both, for example, because the UM-MPR may correspond to uplink muting, and the UE may utilize the UM-MPR based on receiving the configuration of the uplink muting pattern, receiving an activation of the uplink muting pattern, receiving the uplink transmission trigger for an uplink signaling associated with an uplink muting pattern, or any combination thereof.

In some cases, the UM-MPR may be associated with (e.g., is defined for, corresponds to) one or more uplink muting patterns of the set of uplink muting patterns, and the one or more uplink muting patterns may include the indicated uplink muting pattern. For example, the one or more uplink muting patterns may cause an increase in a PAPR associated with the triggered uplink signaling that is different (e.g., larger) than increases to the PAPR caused by other uplink muting patterns of the set of uplink muting patterns, and the UE 315 may not benefit (e.g., or benefit less) from applying the UM-MPR to uplink signaling associated with the other uplink muting patterns. Thus, the UM-MPR may be for the one or more uplink muting patterns of the set of uplink muting patterns.

For example, as described previously, the UE 315 may support the set of uplink muting patterns (e.g., N patterns), and the one or more uplink muting patterns of the set of uplink muting patterns, which may be referred to as a subset of the set of uplink muting patterns, may be associated with application of a UM-MPR to uplink transmissions. As such, the UE 315 may identify the indicated uplink muting pattern is from the subset of the set of uplink muting patterns and may identify that an UM-MPR may be (e.g., should be) applied to the transmission of the one or more uplink message. In some examples, the subset of the set of uplink muting patterns may include uplink muting patterns configured with one or more RBs as the one or more resources for which the UE 315 mutes the uplink transmissions (e.g., RB-based non-transparent uplink muting pattern). Additionally, or alternatively, the subset of the set of uplink muting patterns may include uplink muting patterns configured with one or more REs as the one or more resources for which the UE 315 mutes the uplink transmissions (e.g., RE-based non-transparent uplink muting patterns). Additionally, or alternatively, the subset of the set of uplink muting patterns may include uplink muting patterns configured with one or more RBs and one or more REs as the one or more resources for which the UE 315 mutes the uplink transmissions (e.g., RE/RB based uplink muting patterns). In some examples, each uplink muting pattern of the subset of the set of uplink muting patterns may be associated with a unique UM-MPR (e.g., unique value of the UM-MPR).

Additionally, or alternatively, the entire set of uplink muting patterns (e.g., all uplink muting patterns) may be associated with application of a UM-MPR to uplink transmissions. In some examples, each uplink muting pattern of the set of uplink muting patterns may be associated with a unique UM-MPR (e.g., unique value of the UM-MPR).

In some cases, the UE 315 may identify the UM-MPR (e.g., a value of the UM-MPR) based on one or more factors. For example, the UE 315 may identify the UM-MPR based at least in part on the indicated uplink muting pattern, a waveform type (e.g., DFT-S-OFDM, CP-OFDM) associated with the one or more uplink signals, a modulation scheme (e.g., QPSK, 256-QAM) associated with the one or more uplink signals, or any combination thereof. In some cases, and as illustrated in Table 1, the UE 315 may identify the UM-MPR based on a lookup table that includes multiple UM-MPR values associated with the set of uplink muting patterns (e.g., including the indicated muting pattern), a set of modulation schemes (e.g., including the modulation scheme associated with the one or more uplink signals), a set of waveform types (e.g., including the waveform type associated with the one or more uplink signals), or any combination thereof.

TABLE 1

| Waveform Type and Uplink Muting Pattern Group | Modulation | UM-MPR |
| --- | --- | --- |
| OFDM + Uplink muting group0 | QPSK | Value0 |
| OFDM + Uplink muting group0 | 16-QAM | Value1 |
| . . . | . . . | . . . |
| OFDM + Uplink muting group1 | QPSK | ValueX |
| . . . | . . . | . . . |

In other words, each UM-MPR of the multiple UM-MPRs may be associated with an uplink muting pattern of the set of uplink muting patterns, a modulation scheme of the set of modulation schemes, a waveform type of the set of waveform types, or any combination thereof. In such cases, the lookup table may be known at the UE 315, the network entity 305, or both. In some aspects, the values included in the lookup table may be determined based on one or more measurements, or may be based on other information.

Additionally, or alternatively, the impact of the indicated uplink muting pattern may depend on a type of uplink resource allocation associated with the uplink signaling. For example, an impact of the indicated uplink muting pattern on an EVM associated with the uplink signaling, an ACLR associated with the uplink signaling, an IBE associated with the uplink signaling, or any combination thereof, may be different for different waveforms and different uplink muting patterns. In one example, an uplink signaling associated with an inner frequency resource allocation may be affected by the EVM thresholds (e.g., requirements) for high order modulation, and thus the uplink muting pattern applied to the uplink signaling may affect the EVM compliance of the uplink signaling.

As such, the UE 315 may identify the UM-MPR based on a type of uplink resource allocation (e.g., inner vs outer)

associated with the one or more uplink signals (e.g., based on the set of uplink resources for the one or more uplink signals). For example, edge frequency resource allocations (e.g., outer allocations) may be constrained by out-of-band thresholds (e.g., ACLR) while inner frequency resource allocations may be constrained by in-band thresholds (e.g., EVM, IBE). Thus, the UE 315 may identify a different (e.g., larger) UM-MPR to apply to transmissions of uplink signaling associated with an edge frequency resource allocation than a UM-MPR to apply to one or more transmissions of uplink signaling associated with an inner frequency resource allocation.

In some cases, the UE 315 may identify the UM-MPR based on a type of uplink resource allocation associated with the uplink signaling and a "worst-case" muting pattern. For example, in the context of identifying the UM-MPR, the UE 315 may disregard the indicated uplink muting pattern and may instead assume the UE 315 is to transmit the one or more uplink signals in accordance with a "worst-case" muting pattern (e.g., an uplink muting pattern that increases the PAPR of the uplink signaling the most out of the set of uplink muting patterns, a muting pattern that makes the uplink signaling the least compliant with emissions requirements out of the set of uplink muting patterns).

Additionally, or alternatively, the UE 315 may determine the UM-MPR based on a type of uplink resource allocation associated with the uplink signaling and the indicated uplink muting pattern. For example, the UE 315 may identify a first UM-MPR associated with a first uplink muting pattern (e.g., of the set of uplink muting patterns) and a first type of uplink resource allocation (e.g., frequency resource allocation), and may identify a second UM-MPR, that is different from the first UM-MPR, associated with a second uplink muting pattern (e.g., of the set of uplink muting patterns) and the first type of uplink resource allocation.

At 330, the UE 315 may calculate a threshold transmit power, or output power threshold (e.g., $P_{c,max}$), of the one or more uplink signals based on the UM-MPR (e.g., power reduction value), where the UM-MPR may be associated with the indicated uplink muting pattern, as described herein. In some examples, the UE 315 may calculate the threshold transmit power based on receiving the indication of the uplink muting pattern, receiving an activation of the uplink muting pattern, or receiving the uplink transmission trigger.

For example, the threshold (e.g., maximum) transmit power may be from a range of threshold transmit powers, including a lower bound (e.g., $P_{c,maxL}$) of the range of threshold transmit powers and an upper bound (e.g., $P_{c,maxH}$) of the range of threshold transmit powers. As such, the UE 315 may adjust the lower bound (e.g., $P_{c,maxL}$) based on the identified UM-MPR (e.g., once an uplink muting pattern is activated). For example, the UE 315 may reduce the lower bound by a value of the identified UM-MPR.

At 335, the UE 315 may transmit, via the set of uplink resources, the one or more uplink signals in accordance with the received uplink transmission trigger (e.g., message) and in accordance with the threshold transmit power. In other words, the UE 315 may transmit the one or more uplink signals at a transmit power that satisfies (e.g., is less than) the threshold transmit power.

Figure 4:
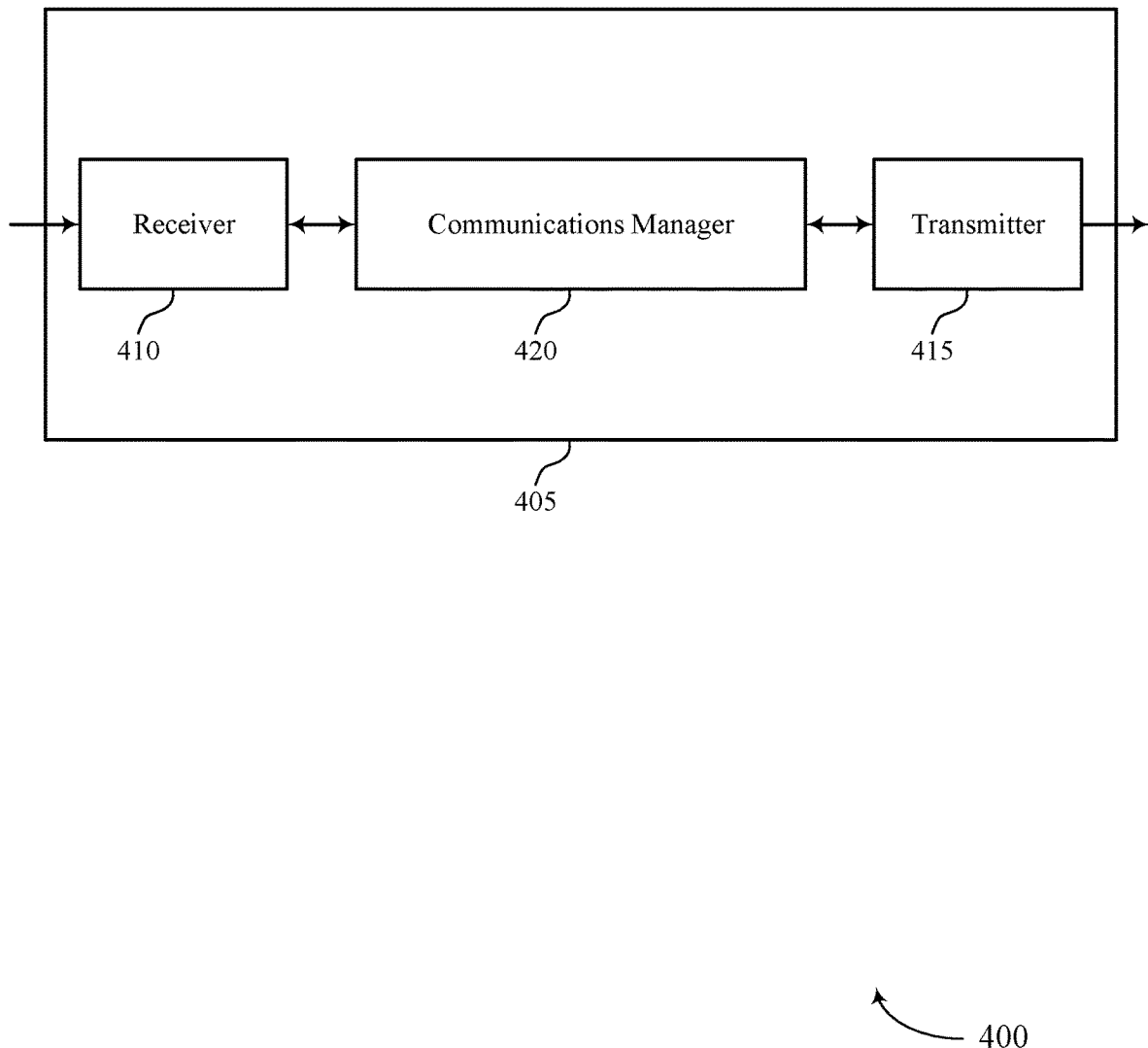
FIGS. 4 and 5 show block diagrams of devices that support power reduction techniques for non-transparent uplink-muting in accordance with one or more aspects of the present disclosure.

FIG. 4 shows a block diagram 400 of a device 405 that supports power reduction techniques for non-transparent uplink-muting in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, and the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to power reduction techniques for non-transparent uplink-muting). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to power reduction techniques for non-transparent uplink-muting). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of power reduction techniques for non-transparent uplink-muting as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor. If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for receiving control signaling indicating a configuration of an uplink muting pattern, the uplink muting pattern including one or more resources for which the UE mutes uplink transmissions. The communications manager 420 is capable of, configured to, or operable to support a means for receiving a message triggering transmission of one or more uplink signals via a set of uplink resources, where the set of uplink resources at least partially overlaps with the one or more resources of the uplink muting pattern. The communications manager 420 is capable of, configured to, or operable to support a means for transmitting, via the set of uplink resources, the one or more uplink signals in accordance with the received message, where a threshold transmit power for transmitting the one or more uplink signals is based on a power reduction value associated with the uplink muting pattern.

By including or configuring the communications manager 420 in accordance with examples as described herein, the device 405 (e.g., at least one processor (not shown) controlling or otherwise coupled with the receiver 410, the transmitter 415, the communications manager 420, or any combination thereof) may support techniques for more efficient utilization of communication resources. For example, the described techniques implemented by the device 405 may reduce instances of non-compliance with emissions thresholds (e.g., emissions requirements) based on implementation of the techniques described herein, which may result in fewer messages that are transmitted and/or received in error, and thus fewer wasted resources and increased communications efficiency. In particular, the techniques described herein that utilize the UM-MPR (e.g., a power reduction value associated with uplink muting) may enable the device 405 to appropriately back off a transmission power to reduce a PAPR of transmissions from the device 405, for example, when the device 405 is aware of one or more uplink muting patterns (e.g., used by one or more network entities for co-channel CLI measurements).

Figure 5:
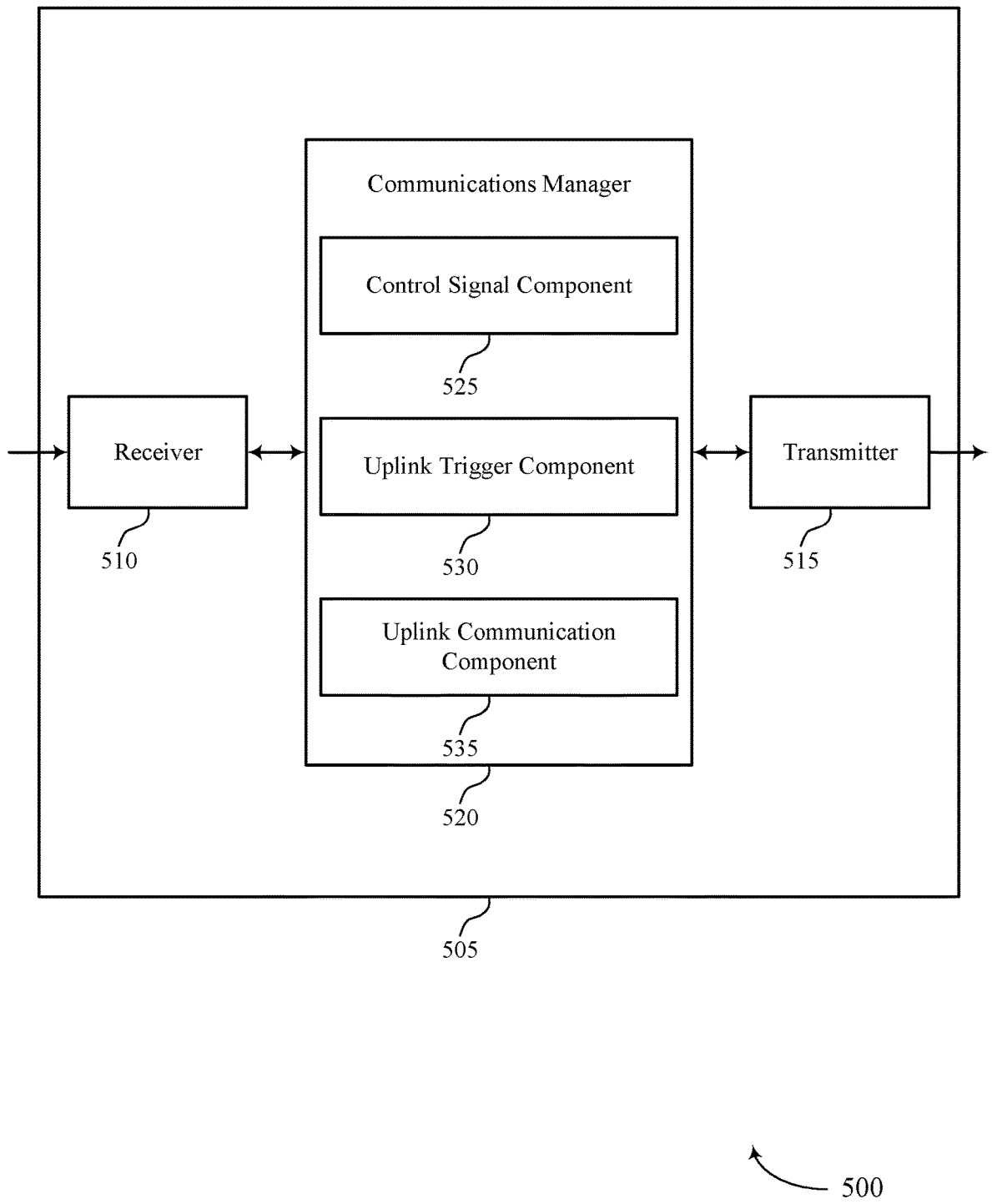

FIG. 5 shows a block diagram 500 of a device 505 that supports power reduction techniques for non-transparent uplink-muting in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor (not shown), which may be coupled with at least one memory (not shown), to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to power reduction techniques for non-transparent uplink-muting). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to power reduction techniques for non-transparent uplink-muting). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of power reduction techniques for non-transparent uplink-muting as described herein. For example, the communications manager 520 may include a control signal component 525, an uplink trigger component 530, an uplink communication component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The control signal component 525 is capable of, configured to, or operable to support a means for receiving control signaling indicating a configuration of an uplink muting pattern, the uplink muting pattern including one or more resources for which the UE mutes uplink transmissions. The uplink trigger component 530 is capable of, configured to, or operable to support a means for receiving a message triggering transmission of one or more uplink signals via a set of uplink resources, where the set of uplink resources at least partially overlaps with the one or more resources of the uplink muting pattern. The uplink communication component 535 is capable of, configured to, or operable to support a means for transmitting, via the set of uplink resources, the one or more uplink signals in accordance with the received message, where a threshold transmit power for transmitting the one or more uplink signals is based on a power reduction value associated with the uplink muting pattern.

Figure 6:
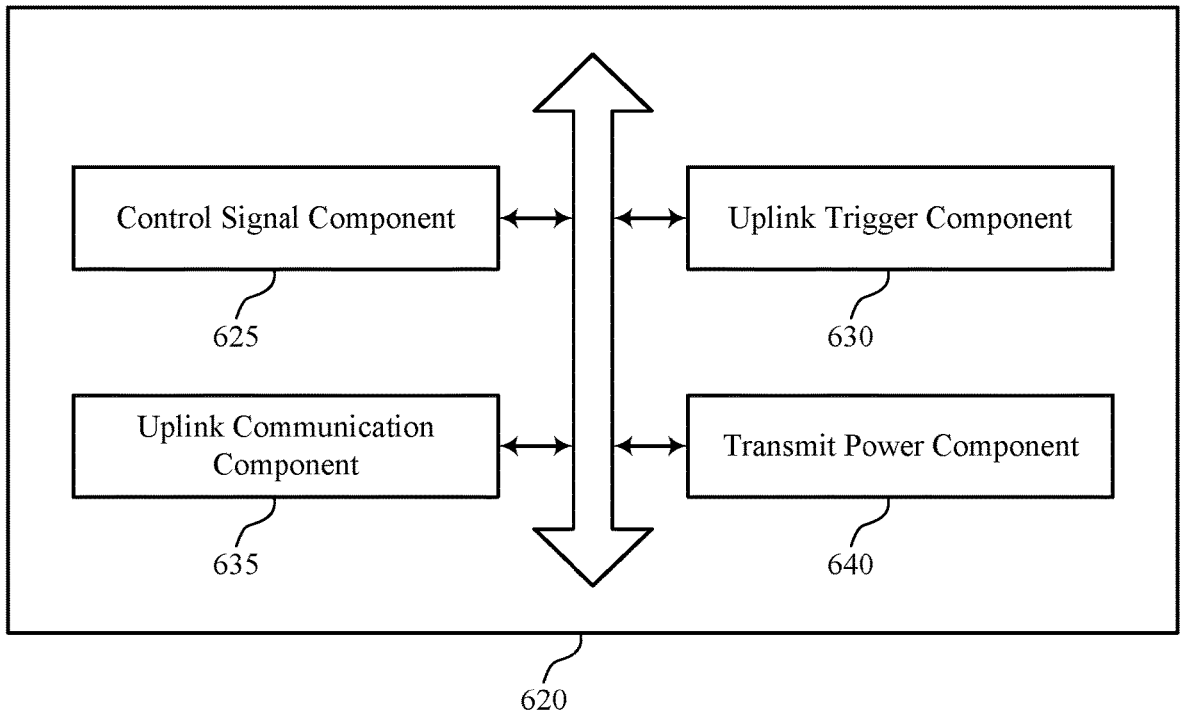
FIG. 6 shows a block diagram of a communications manager that supports power reduction techniques for non-transparent uplink-muting in accordance with one or more aspects of the present disclosure.

FIG. 6 shows a block diagram 600 of a communications manager 620 that supports power reduction techniques for non-transparent uplink-muting in accordance with one or more aspects of the present disclosure. The communications manager 620 may be an example of aspects of a communications manager 420, a communications manager 520, or both, as described herein. The communications manager 620, or various components thereof, may be an example of means for performing various aspects of power reduction techniques for non-transparent uplink-muting as described herein. For example, the communications manager 620 may include a control signal component 625, an uplink trigger component 630, an uplink communication component 635, a transmit power component 640, or any combination thereof. Each of these components, or components or subcomponents thereof (e.g., one or more processors (not shown), one or more memories (not shown)), may communicate, directly or indirectly, with one another (e.g., via one or more buses).

The communications manager 620 may support wireless communications in accordance with examples as disclosed herein. The control signal component 625 is capable of, configured to, or operable to support a means for receiving control signaling indicating a configuration of an uplink muting pattern, the uplink muting pattern including one or more resources for which the UE mutes uplink transmissions. The uplink trigger component 630 is capable of, configured to, or operable to support a means for receiving a message triggering transmission of one or more uplink signals via a set of uplink resources, where the set of uplink resources at least partially overlaps with the one or more resources of the uplink muting pattern. The uplink communication component 635 is capable of, configured to, or operable to support a means for transmitting, via the set of uplink resources, the one or more uplink signals in accordance with the received message, where a threshold transmit power for transmitting the one or more uplink signals is based on a power reduction value associated with the uplink muting pattern.

In some examples, the transmit power component 640 is capable of, configured to, or operable to support a means for calculating the threshold transmit power of the one or more uplink signals based on the power reduction value, where the power reduction value is associated with a set of uplink muting patterns that includes the uplink muting pattern.

In some examples, the set of uplink muting patterns includes at least one uplink muting pattern configured with one or more RBs as the one or more resources for which the UE mutes the uplink transmissions.

In some examples, the set of uplink muting patterns includes at least one uplink muting pattern configured with one or more REs as the one or more resources for which the UE mutes the uplink transmissions.

In some examples, the set of uplink muting patterns includes a subset of a set of multiple uplink muting patterns.

In some examples, each uplink muting pattern of the set of uplink muting patterns is associated with a respective power reduction value.

In some examples, the transmit power component 640 is capable of, configured to, or operable to support a means for identifying the power reduction value based on the uplink muting pattern, a waveform type associated with the one or more uplink signals, a modulation scheme associated with the one or more uplink signals, or any combination thereof.

In some examples, the power reduction value is identified based on a lookup table that includes a set of multiple power reduction values associated with respective uplink muting patterns.

In some examples, the transmit power component 640 is capable of, configured to, or operable to support a means for identifying the power reduction value based on an allocation type of the set of uplink resources, where the allocation type includes an inner resource allocation or an outer resource allocation.

In some examples, the transmit power component 640 is capable of, configured to, or operable to support a means for identifying the power reduction value based on the uplink muting pattern and an allocation type of the set of uplink resources, where the allocation type includes an inner resource allocation or an outer resource allocation.

In some examples, the uplink muting pattern is associated with CLI mitigation for a network entity operating in a full duplex mode. In some examples, the set of uplink resources is associated with at least one full-duplex slot.

Figure 7:
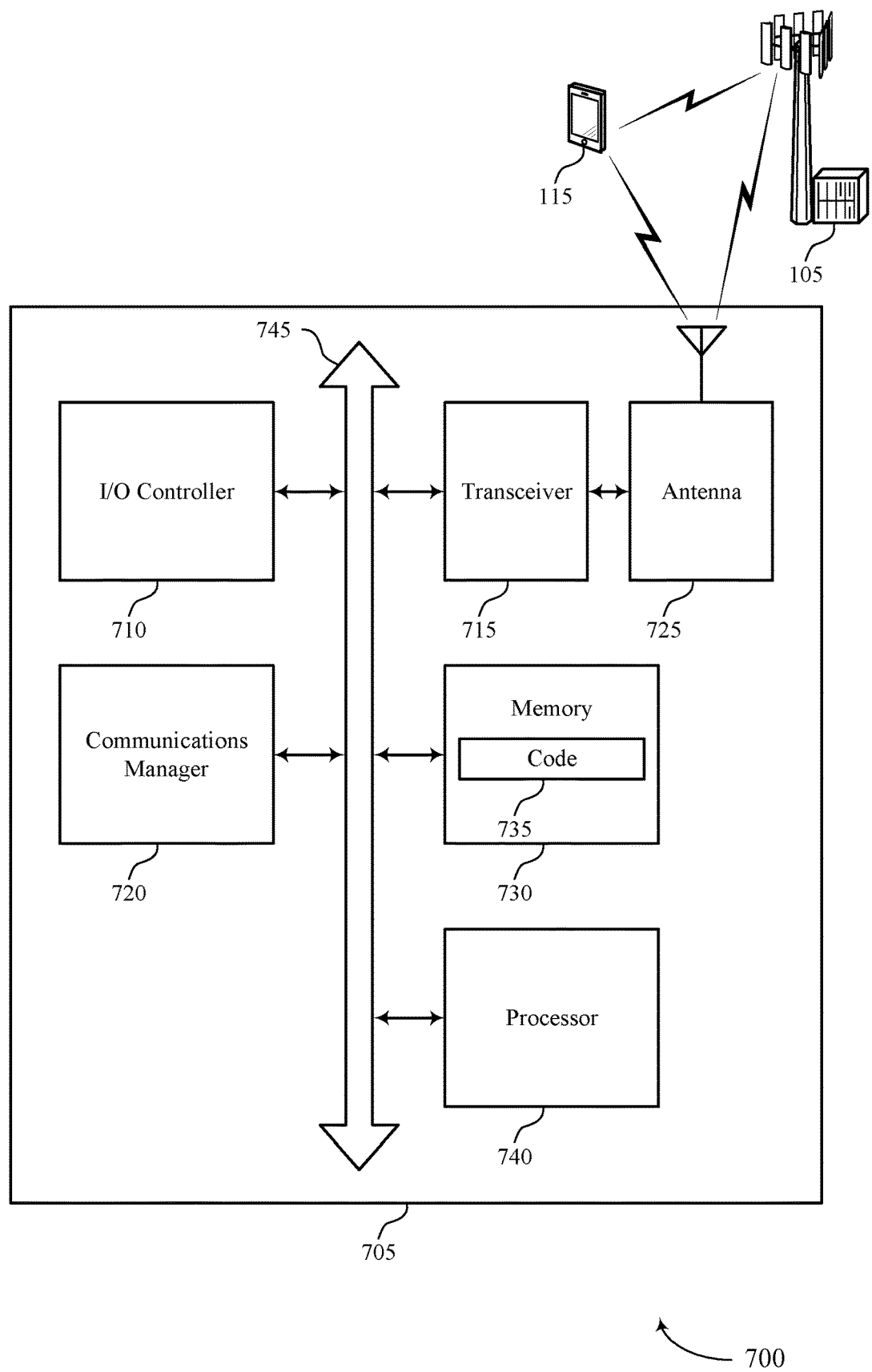
FIG. 7 shows a diagram of a system including a device that supports power reduction techniques for non-transparent uplink-muting in accordance with one or more aspects of the present disclosure.

FIG. 7 shows a diagram of a system 700 including a device 705 that supports power reduction techniques for non-transparent uplink-muting in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable code 735 including instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may contain, among other things, a basic I/O system (BIOS) which may control basic hardware or software operation such as the interaction with peripheral components or devices.

The at least one processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting power reduction techniques for non-transparent uplink-muting). For example, the device 705 or a component of the device 705 may include at least one processor 740 and at least one memory 730 coupled with or to the at least one processor 740, the at least one processor 740 and at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. As such, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for receiving control signaling indicating a configuration of an uplink muting pattern, the uplink muting pattern including one or more resources for which the UE mutes uplink transmissions. The communications manager 720 is capable of, configured to, or operable to support a means for receiving a message triggering transmission of one or more uplink signals via a set of uplink resources, where the set of uplink resources at least partially overlaps with the one or more resources of the uplink muting pattern. The communications manager 720 is capable of, configured to, or operable to support a means for transmitting, via the set of uplink resources, the one or more uplink signals in accordance with the received message, where a threshold transmit power for transmitting the one or more uplink signals is based on a power reduction value associated with the uplink muting pattern.

By including or configuring the communications manager 720 in accordance with examples as described herein, the device 705 may support techniques for improved communication reliability. For example, the described techniques implemented by the device 705 may reduce instances of non-compliance with emissions thresholds (e.g., emissions requirements) based on implementation of the techniques described herein, which may result in fewer messages that are transmitted and/or received in error, and thus fewer wasted resources and increased communications efficiency. In particular, the techniques described herein that utilize the UM-MPR (e.g., a power reduction value associated with uplink muting) may enable the device 405 to efficiently back off a transmission power and reduce a PAPR of one or more transmissions from the device 705, for example, when the device 705 is aware of one or more uplink muting patterns (e.g., used by one or more network entities for co-channel CLI measurements).

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described herein with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of power reduction techniques for non-transparent uplink-muting as described herein, or the at least one processor 740 and the at least one memory 730 may be otherwise configured to, individually or collectively, perform or support such operations.

Figure 8:
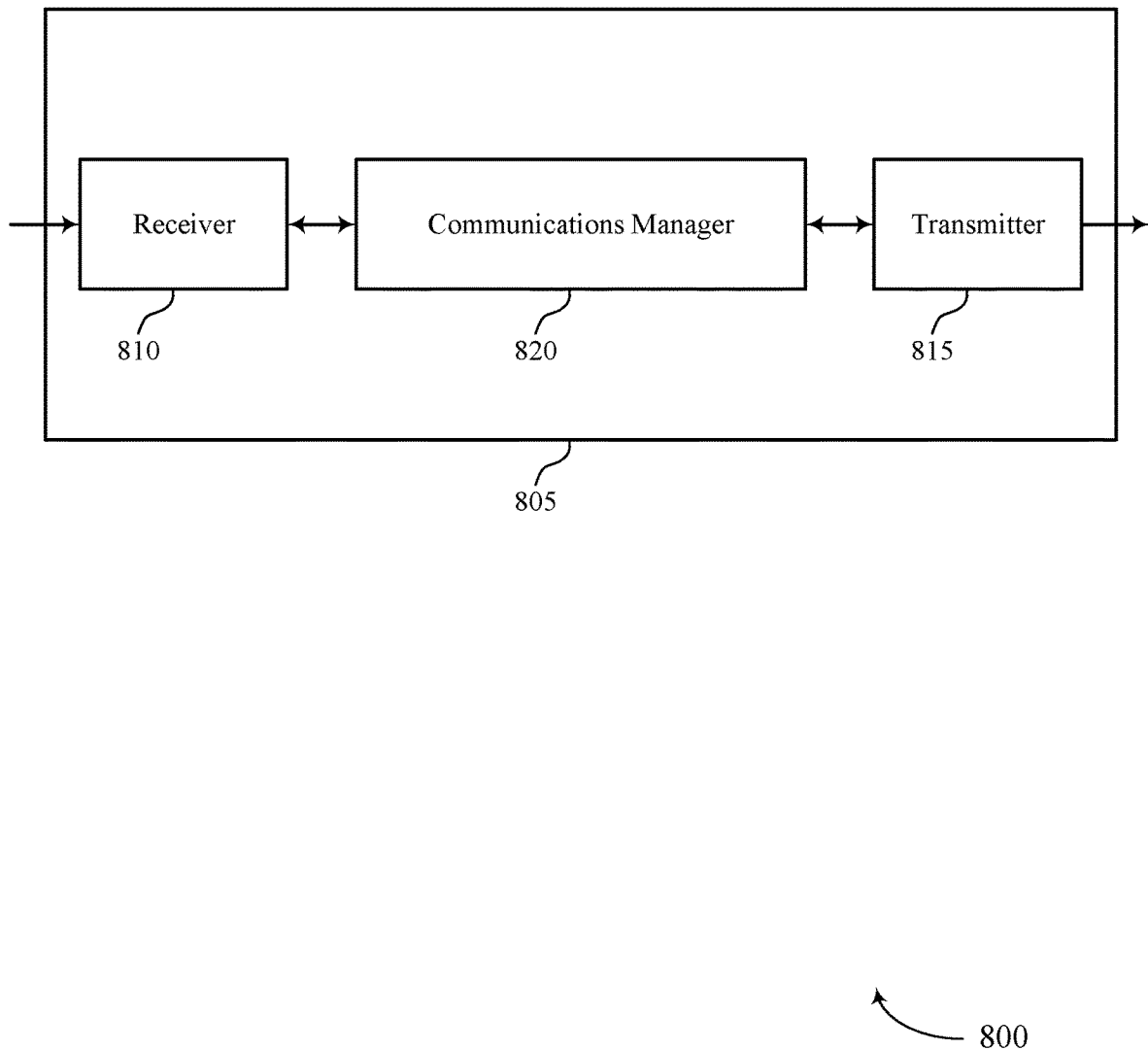
FIGS. 8 and 9 show block diagrams of devices that support power reduction techniques for non-transparent uplink-muting in accordance with one or more aspects of the present disclosure.

FIG. 8 shows a block diagram 800 of a device 805 that supports power reduction techniques for non-transparent uplink-muting in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, and the communications manager 820), may include at least one processor (not shown), which may be coupled with at least one memory (not shown), to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of power reduction techniques for non-transparent uplink-muting as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for transmitting control signaling indicating a configuration of an uplink muting pattern, the uplink muting pattern including one or more resources for which a UE mutes uplink transmissions. The communications manager 820 is capable of, configured to, or operable to support a means for transmitting a message triggering transmission of one or more uplink signals via a set of uplink resources, where the set of uplink resources at least partially overlaps with the one or more resources of the uplink muting pattern. The communications manager 820 is capable of, configured to, or operable to support a means for receiving, via the set of uplink resources, the one or more uplink signals in accordance with the transmitted message, where a transmit power of at least one of the one or more uplink signals is based on a power reduction value associated with the uplink muting pattern.

By including or configuring the communications manager 820 in accordance with examples as described herein, the device 805 (e.g., at least one processor controlling or otherwise coupled with the receiver 810, the transmitter 815, the communications manager 820, or any combination thereof) may support techniques for more efficient utilization of communication resources. For example, the device 805 may reduce instances of non-compliance with emissions thresholds (e.g., requirements) based on implementation of the techniques described herein, which may lead to less messages transmitted or received in error, and thus less wasted resources.

Figure 9:
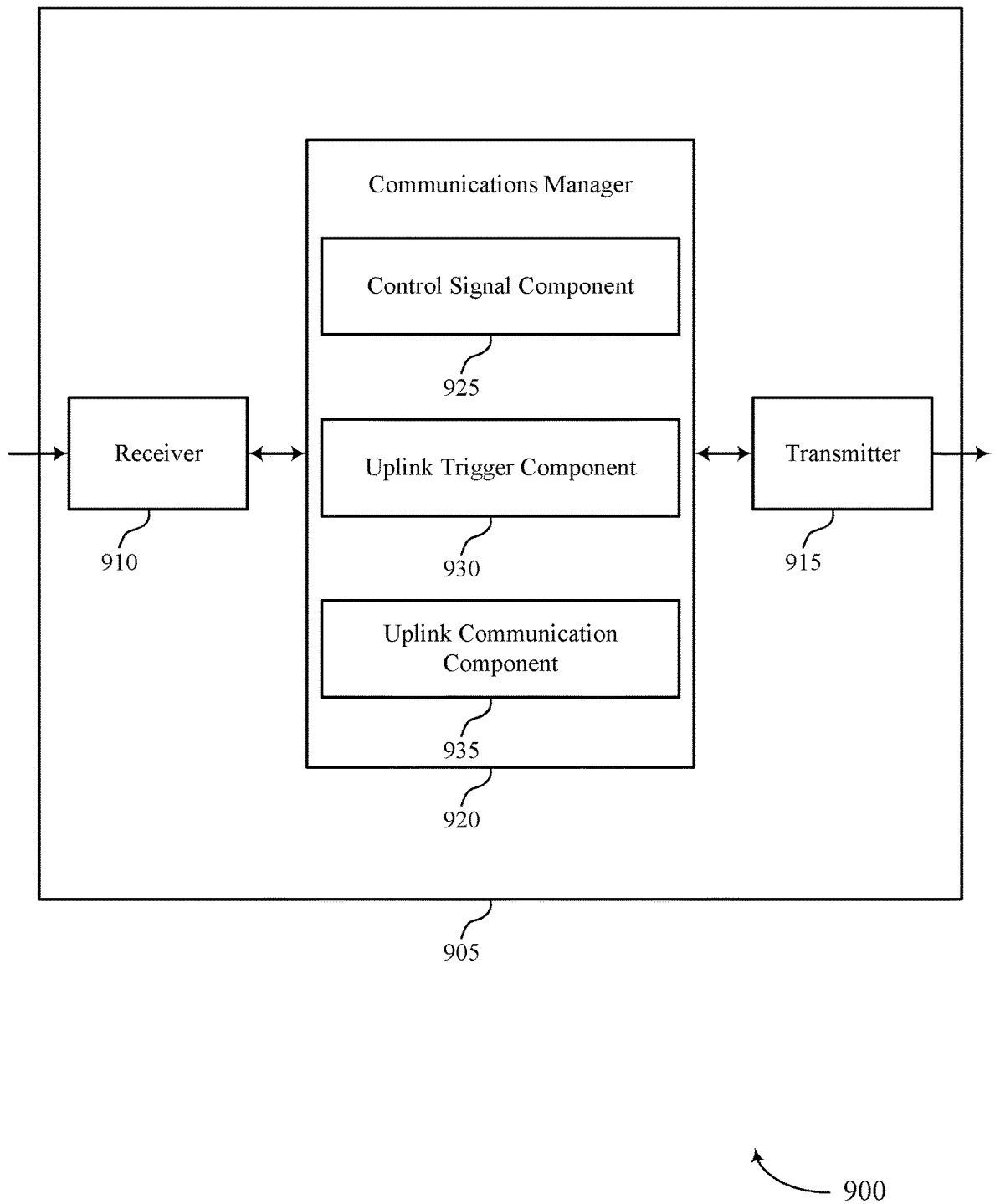

FIG. 9 shows a block diagram 900 of a device 905 that supports power reduction techniques for non-transparent uplink-muting in accordance with one or more aspects of the present disclosure. The device 905 may be an example of aspects of a device 805 or a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor (not shown), which may be coupled with at least one memory (not shown), to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of power reduction techniques for non-transparent uplink-muting as described herein. For example, the communications manager 920 may include a control signal component 925, an uplink trigger component 930, an uplink communication component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The control signal component 925 is capable of, configured to, or operable to support a means for transmitting control signaling indicating a configuration of an uplink muting pattern, the uplink muting pattern including one or more resources for which a UE mutes uplink transmissions. The uplink trigger component 930 is capable of, configured to, or operable to support a means for transmitting a message triggering transmission of one or more uplink signals via a set of uplink resources, where the set of uplink resources at least partially overlaps with the one or more resources of the uplink muting pattern. The uplink communication component 935 is capable of, configured to, or operable to support a means for receiving, via the set of uplink resources, the one or more uplink signals in accordance with the transmitted message, where a transmit power of at least one of the one or more uplink signals is based on a power reduction value associated with the uplink muting pattern.

Figure 10:
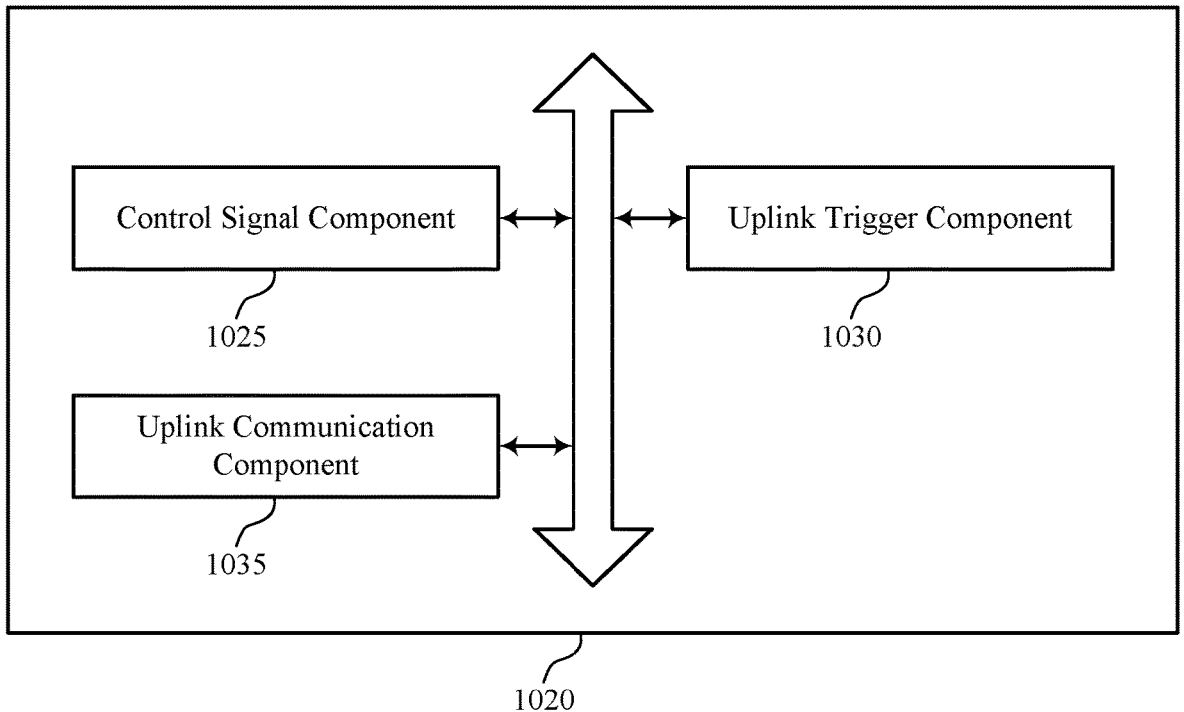
FIG. 10 shows a block diagram of a communications manager that supports power reduction techniques for non-transparent uplink-muting in accordance with one or more aspects of the present disclosure.

FIG. 10 shows a block diagram 1000 of a communications manager 1020 that supports power reduction techniques for non-transparent uplink-muting in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of power reduction techniques for non-transparent uplink-muting as described herein. For example, the communications manager 1020 may include a control signal component 1025, an uplink trigger component 1030, an uplink communication component 1035, or any combination thereof. Each of these components, or components or subcomponents thereof (e.g., one or more processors (not shown), one or more memories (not shown)), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. The control signal component 1025 is capable of, configured to, or operable to support a means for transmitting control signaling indicating a configuration of an uplink muting pattern, the uplink muting pattern including one or more resources for which a UE mutes uplink transmissions. The uplink trigger component 1030 is capable of, configured to, or operable to support a means for transmitting a message triggering transmission of one or more uplink signals via a set of uplink resources, where the set of uplink resources at least partially overlaps with the one or more resources of the uplink muting pattern. The uplink communication component 1035 is capable of, configured to, or operable to support a means for receiving, via the set of uplink resources, the one or more uplink signals in accordance with the transmitted message, where a transmit power of at least one of the one or more uplink signals is based on a power reduction value associated with the uplink muting pattern.

In some examples, the power reduction value is associated with a set of uplink muting patterns that includes the uplink muting pattern. In some examples, the set of uplink muting patterns includes at least one uplink muting pattern configured with one or more RBs as the one or more resources for which the UE mutes the uplink transmissions. In some examples, the set of uplink muting patterns includes at least one uplink muting pattern configured with one or more REs as the one or more resources for which the UE mutes the uplink transmissions.

In some examples, the set of uplink muting patterns includes a subset of a set of multiple uplink muting patterns. In some examples, each uplink muting pattern of the set of uplink muting patterns is associated with a respective power reduction value. In some examples, the power reduction value is based on the uplink muting pattern, a waveform type associated with the one or more uplink signals, a modulation scheme associated with the one or more uplink signals, or any combination thereof.

In some examples, the power reduction value is based on a lookup table that includes a set of multiple power reduction values associated with respective uplink muting patterns. In some examples, the power reduction value is based on an allocation type of the set of uplink resources. In some examples, the allocation type includes an inner resource allocation or an outer resource allocation.

In some examples, the power reduction value is based on the uplink muting pattern and an allocation type of the set of uplink resources. In some examples, the allocation type includes an inner resource allocation or an outer resource allocation. In some examples, the uplink muting pattern is associated with CLI mitigation for the network entity operating in a full duplex mode. In some examples, the set of uplink resources is associated with at least one full-duplex slot.

Figure 11:
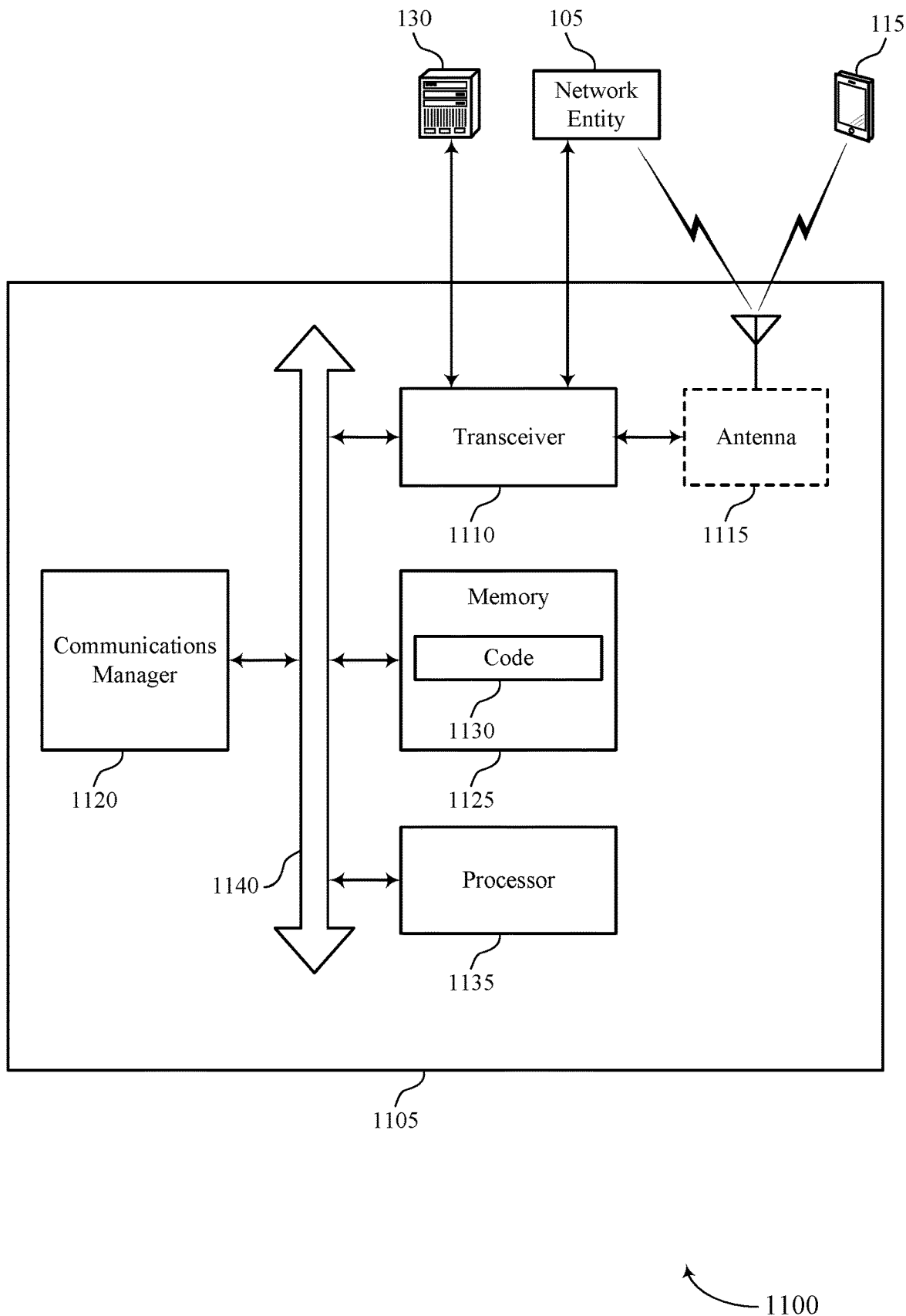
FIG. 11 shows a diagram of a system including a device that supports power reduction techniques for non-transparent uplink-muting in accordance with one or more aspects of the present disclosure.

FIG. 11 shows a diagram of a system 1100 including a device 1105 that supports power reduction techniques for non-transparent uplink-muting in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or any combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., a communication link 125, a backhaul communication link 120, a midhaul communication link 162, a fronthaul communication link 168).

The at least one memory 1125 may include RAM, ROM, or any combination thereof. The at least one memory 1125 may store computer-readable, computer-executable code 1130 including instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may contain, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting power reduction techniques for non-transparent uplink-muting). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125). In some examples, the at least one processor 1135 may include multiple processors and the at least one memory 1125 may include multiple memories. One or more of the multiple processors may be coupled with one or more of the multiple memories, which may, individually or collectively, be configured to perform various functions herein. In some examples, the at least one processor 1135 may be a component of a processing system, which may refer to a system (such as a series) of machines, circuitry (including, for example, one or both of processor circuitry (which may include the at least one processor 1135) and memory circuitry (which may include the at least one memory 1125)), or components, that receives or obtains inputs and processes the inputs to produce, generate, or obtain a set of outputs. The processing system may be configured to perform one or more of the functions described herein. As such, the at least one processor 1135 or a processing system including the at least one processor 1135 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1125 or otherwise, to perform one or more of the functions described herein.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications in accordance with examples as disclosed herein. For example, the communications manager 1120 is capable of, configured to, or operable to support a means for transmitting control signaling indicating a configuration of an uplink muting pattern, the uplink muting pattern including one or more resources for which a UE mutes uplink transmissions. The communications manager 1120 is capable of, configured to, or operable to support a means for transmitting a message triggering transmission of one or more uplink signals via a set of uplink resources, where the set of uplink resources at least partially overlaps with the one or more resources of the uplink muting pattern. The communications manager 1120 is capable of, configured to, or operable to support a means for receiving, via the set of uplink resources, the one or more uplink signals in accordance with the transmitted message, where a transmit power of at least one of the one or more uplink signals is based on a power reduction value associated with the uplink muting pattern.

By including or configuring the communications manager 1120 in accordance with examples as described herein, the device 1105 may support techniques for improved communication reliability. For example, the device 1105 may reduce instances of non-compliance with emissions thresholds (e.g., requirements) based on implementation of the techniques described herein, which may lead to less messages transmitted or received in error, and thus improve communication reliability.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described herein with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of power reduction techniques for non-transparent uplink-muting as described herein, or the at least one processor 1135 and the at least one memory 1125 may be otherwise configured to, individually or collectively, perform or support such operations.

Figure 12:
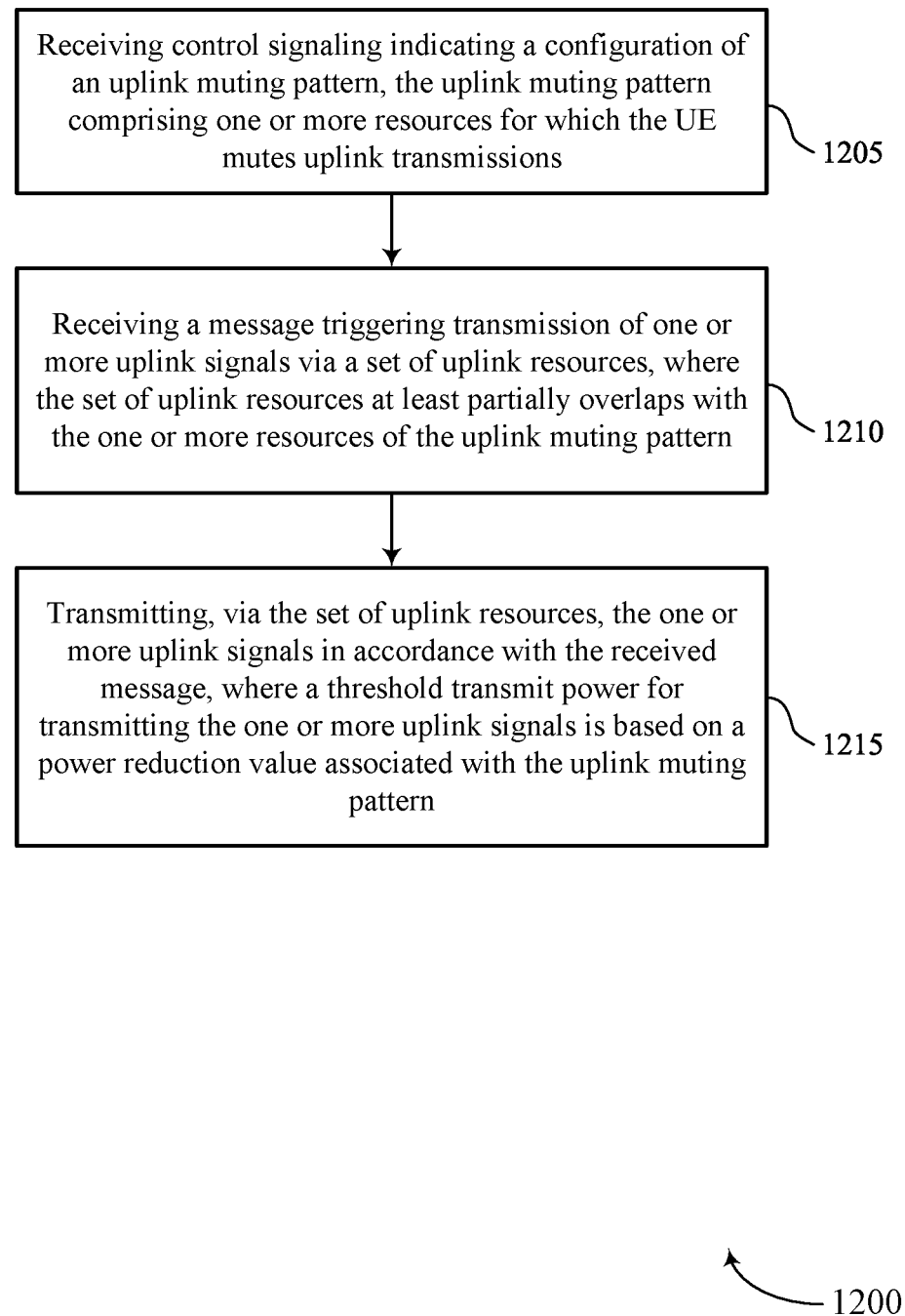
FIGS. 12 through 15 show flowcharts illustrating methods that support power reduction techniques for non-transparent uplink-muting in accordance with one or more aspects of the present disclosure.

FIG. 12 shows a flowchart illustrating a method 1200 that supports power reduction techniques for non-transparent uplink-muting in accordance with one or more aspects of the present disclosure. The operations of the method 1200 may be implemented by a UE or its components as described herein. For example, the operations of the method 1200 may be performed by a UE 115 as described herein with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving control signaling comprising a configuration of an uplink muting pattern, the uplink muting pattern comprising one or more resources for which the UE mutes uplink transmissions. The operations of 1205 may be performed in accordance with examples as disclosed herein. In some examples, aspects of the operations of 1205 may be performed by a control signal component 625 as described herein with reference to FIG. 6.

At 1210, the method may include receiving a message triggering transmission of one or more uplink signals via a set of uplink resources, where the set of uplink resources at least partially overlaps with the one or more resources of the uplink muting pattern. The operations of 1210 may be performed in accordance with examples as disclosed herein. In some examples, aspects of the operations of 1210 may be performed by an uplink trigger component 630 as described herein with reference to FIG. 6.

At 1215, the method may include transmitting, via the set of uplink resources, the one or more uplink signals in accordance with the received message, where a threshold transmit power for transmitting the one or more uplink signals is based on a power reduction value associated with the uplink muting pattern. The operations of 1215 may be performed in accordance with examples as disclosed herein. In some examples, aspects of the operations of 1215 may be performed by an uplink communication component 635 as described herein with reference to FIG. 6.

Figure 13:
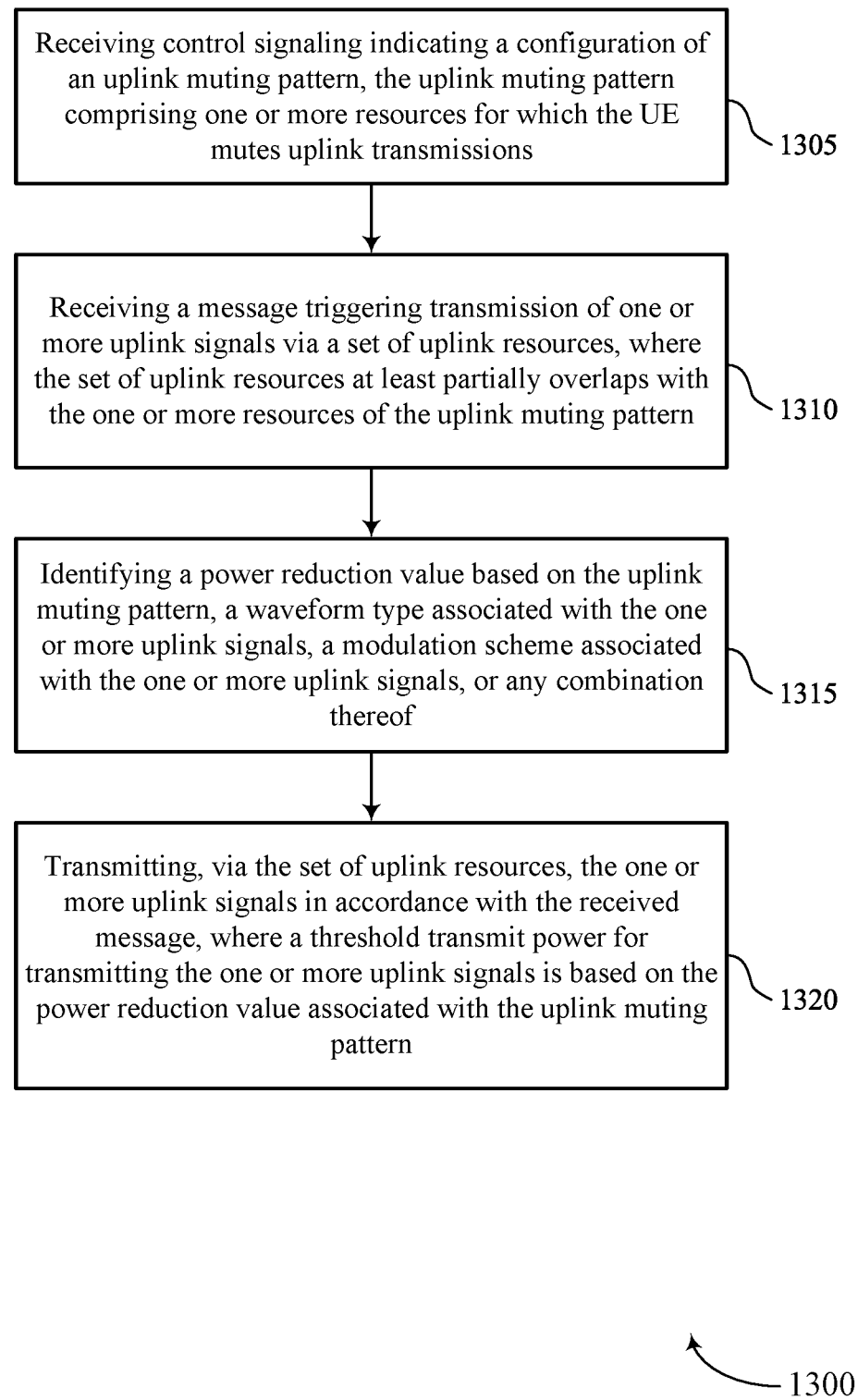

FIG. 13 shows a flowchart illustrating a method 1300 that supports power reduction techniques for non-transparent uplink-muting in accordance with one or more aspects of the present disclosure. The operations of the method 1300 may be implemented by a UE or its components as described herein. For example, the operations of the method 1300 may be performed by a UE 115 as described herein with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving control signaling indicating a configuration of an uplink muting pattern, the uplink muting pattern comprising one or more resources for which the UE mutes uplink transmissions. The operations of 1305 may be performed in accordance with examples as disclosed herein. In some examples, aspects of the operations of 1305 may be performed by a control signal component 625 as described herein with reference to FIG. 6.

At 1310, the method may include receiving a message triggering transmission of one or more uplink signals via a set of uplink resources, where the set of uplink resources at least partially overlaps with the one or more resources of the uplink muting pattern. The operations of 1310 may be performed in accordance with examples as disclosed herein. In some examples, aspects of the operations of 1310 may be performed by an uplink trigger component 630 as described herein with reference to FIG. 6.

At 1315, the method may include identifying a power reduction value based on the uplink muting pattern, a waveform type associated with the one or more uplink signals, a modulation scheme associated with the one or more uplink signals, or any combination thereof. The operations of 1315 may be performed in accordance with examples as disclosed herein. In some examples, aspects of the operations of 1315 may be performed by a transmit power component 640 as described herein with reference to FIG. 6.

At 1320, the method may include transmitting, via the set of uplink resources, the one or more uplink signals in accordance with the received message, where a threshold transmit power for transmitting the one or more uplink signals is based on the power reduction value associated with the uplink muting pattern. The operations of 1320 may be performed in accordance with examples as disclosed herein. In some examples, aspects of the operations of 1320 may be performed by an uplink communication component 635 as described herein with reference to FIG. 6.

Figure 14:
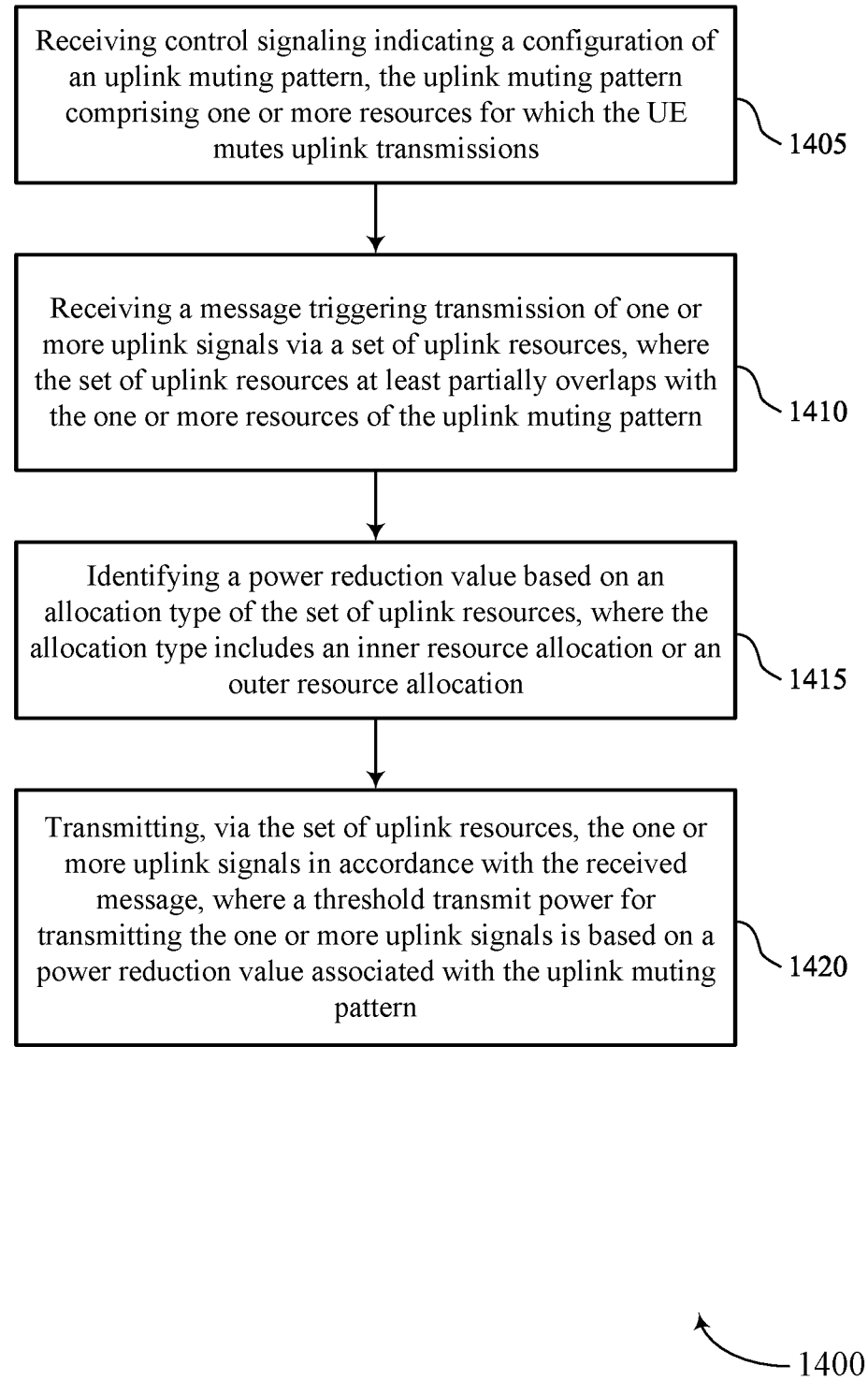

FIG. 14 shows a flowchart illustrating a method 1400 that supports power reduction techniques for non-transparent uplink-muting in accordance with one or more aspects of the present disclosure. The operations of the method 1400 may be implemented by a UE or its components as described herein. For example, the operations of the method 1400 may be performed by a UE 115 as described herein with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include receiving control signaling indicating a configuration of an uplink muting pattern, the uplink muting pattern comprising one or more resources for which the UE mutes uplink transmissions. The operations of 1405 may be performed in accordance with examples as disclosed herein. In some examples, aspects of the operations of 1405 may be performed by a control signal component 625 as described herein with reference to FIG. 6.

At 1410, the method may include receiving a message triggering transmission of one or more uplink signals via a set of uplink resources, where the set of uplink resources at least partially overlaps with the one or more resources of the uplink muting pattern. The operations of 1410 may be performed in accordance with examples as disclosed herein. In some examples, aspects of the operations of 1410 may be performed by an uplink trigger component 630 as described herein with reference to FIG. 6.

At 1415, the method may include identifying a power reduction value based on an allocation type of the set of uplink resources, where the allocation type includes an inner resource allocation or an outer resource allocation. The operations of 1415 may be performed in accordance with examples as disclosed herein. In some examples, aspects of the operations of 1415 may be performed by a transmit power component 640 as described herein with reference to FIG. 6.

At 1420, the method may include transmitting, via the set of uplink resources, the one or more uplink signals in accordance with the received message, where a threshold transmit power for transmitting the one or more uplink signals is based on the power reduction value associated with the uplink muting pattern. The operations of 1420 may be performed in accordance with examples as disclosed herein. In some examples, aspects of the operations of 1420 may be performed by an uplink communication component 635 as described herein with reference to FIG. 6.

Figure 15:
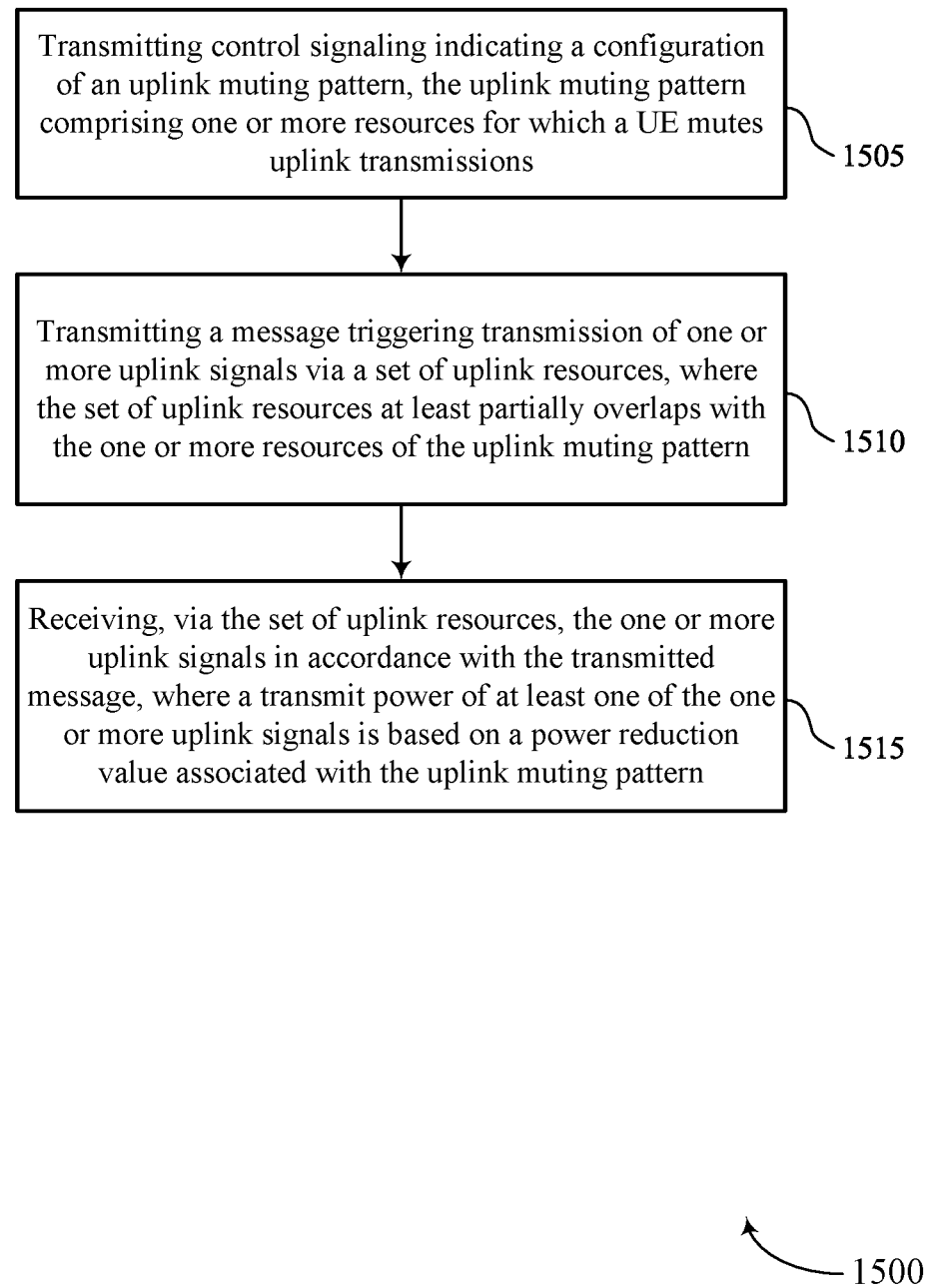

FIG. 15 shows a flowchart illustrating a method 1500 that supports power reduction techniques for non-transparent uplink-muting in accordance with one or more aspects of the present disclosure. The operations of the method 1500 may be implemented by a network entity or its components as described herein. For example, the operations of the method 1500 may be performed by a network entity as described herein with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include transmitting control signaling indicating a configuration of an uplink muting pattern, the uplink muting pattern comprising one or more resources for which a UE mutes uplink transmissions. The operations of 1505 may be performed in accordance with examples as disclosed herein. In some examples, aspects of the operations of 1505 may be performed by a control signal component 1025 as described herein with reference to FIG. 10.

At 1510, the method may include transmitting a message triggering transmission of one or more uplink signals via a set of uplink resources, where the set of uplink resources at least partially overlaps with the one or more resources of the uplink muting pattern. The operations of 1510 may be performed in accordance with examples as disclosed herein. In some examples, aspects of the operations of 1510 may be performed by an uplink trigger component 1030 as described herein with reference to FIG. 10.

At 1515, the method may include receiving, via the set of uplink resources, the one or more uplink signals in accordance with the transmitted message, where a transmit power of at least one of the one or more uplink signals is based on a power reduction value associated with the uplink muting pattern. The operations of 1515 may be performed in accordance with examples as disclosed herein. In some examples, aspects of the operations of 1515 may be performed by an uplink communication component 1035 as described herein with reference to FIG. 10.

The following provides an overview of aspects of the present disclosure:

Aspect 1: A method for wireless communications at a UE, comprising: receiving control signaling indicating a configuration of an uplink muting pattern, the uplink muting pattern comprising one or more resources for which the UE mutes uplink transmissions; receiving a message triggering transmission of one or more uplink signals via a set of uplink resources, wherein the set of uplink resources at least partially overlaps with the one or more resources of the uplink muting pattern; and transmitting, via the set of uplink resources, the one or more uplink signals in accordance with the received message, wherein a threshold transmit power for transmitting the one or more uplink signals is based at least in part on a power reduction value associated with the uplink muting pattern.

Aspect 2: The method of aspect 1, further comprising: calculating the threshold transmit power of the one or more uplink signals based at least in part on the power reduction value, wherein the power reduction value is associated with a set of uplink muting patterns that includes the uplink muting pattern.

Aspect 3: The method of aspect 2, wherein the set of uplink muting patterns comprises at least one uplink muting pattern configured with one or more RBs as the one or more resources for which the UE mutes the uplink transmissions.

Aspect 4: The method of any of aspects 2 through 3, wherein the set of uplink muting patterns comprises at least one uplink muting pattern configured with one or more REs as the one or more resources for which the UE mutes the uplink transmissions.

Aspect 5: The method of any of aspects 2 through 4, wherein the set of uplink muting patterns comprises a subset of a plurality of uplink muting patterns.

Aspect 6: The method of any of aspects 2 through 5, wherein each uplink muting pattern of the set of uplink muting patterns is associated with a respective power reduction value.

Aspect 7: The method of any of aspects 1 through 6, further comprising: identifying the power reduction value based at least in part on the uplink muting pattern, a waveform type associated with the one or more uplink signals, a modulation scheme associated with the one or more uplink signals, or any combination thereof.

Aspect 8: The method of aspect 7, wherein the power reduction value is identified based at least in part on a lookup table that comprises a plurality of power reduction values associated with respective uplink muting patterns.

Aspect 9: The method of any of aspects 1 through 8, further comprising: identifying the power reduction value based at least in part on an allocation type of the set of uplink resources, wherein the allocation type comprises an inner resource allocation or an outer resource allocation.

Aspect 10: The method of any of aspects 1 through 9, further comprising: identifying the power reduction value based at least in part on the uplink muting pattern and an allocation type of the set of uplink resources, wherein the allocation type comprises an inner resource allocation or an outer resource allocation.

Aspect 11: The method of any of aspects 1 through 10, wherein the uplink muting pattern is associated with cross-link interference mitigation for a network entity operating in a full duplex mode, and the set of uplink resources is associated with at least one full-duplex slot.

Aspect 12: A method for wireless communications at a network entity, comprising: transmitting control signaling indicating a configuration of an uplink muting pattern, the uplink muting pattern comprising one or more resources for which a UE mutes uplink transmissions; transmitting a message triggering transmission of one or more uplink signals via a set of uplink resources, wherein the set of uplink resources at least partially overlaps with the one or more resources of the uplink muting pattern; and receiving, via the set of uplink resources, the one or more uplink signals in accordance with the transmitted message, wherein a transmit power of at least one of the one or more uplink signals is based at least in part on a power reduction value associated with the uplink muting pattern.

Aspect 13: The method of aspect 12, wherein the power reduction value is associated with a set of uplink muting patterns that includes the uplink muting pattern.

Aspect 14: The method of aspect 13, wherein the set of uplink muting patterns comprises at least one uplink muting pattern configured with one or more RBs as the one or more resources for which the UE mutes the uplink transmissions.

Aspect 15: The method of any of aspects 13 through 14, wherein the set of uplink muting patterns comprises at least one uplink muting pattern configured with one or more REs as the one or more resources for which the UE mutes the uplink transmissions.

Aspect 16: The method of any of aspects 13 through 15, wherein the set of uplink muting patterns comprises a subset of a plurality of uplink muting patterns.

Aspect 17: The method of any of aspects 13 through 16, wherein each uplink muting pattern of the set of uplink muting patterns is associated with a respective power reduction value.

Aspect 18: The method of any of aspects 12 through 17, wherein the power reduction value is based at least in part on the uplink muting pattern, a waveform type associated with the one or more uplink signals, a modulation scheme associated with the one or more uplink signals, or any combination thereof.

Aspect 19: The method of any of aspects 12 through 18, wherein the power reduction value is based at least in part on a lookup table that comprises a plurality of power reduction values associated with respective uplink muting patterns.

Aspect 20: The method of any of aspects 12 through 19, wherein the power reduction value is based at least in part on an allocation type of the set of uplink resources, the allocation type comprises an inner resource allocation or an outer resource allocation.

Aspect 21: The method of any of aspects 12 through 20, wherein the power reduction value is based at least in part on the uplink muting pattern and an allocation type of the set of uplink resources, the allocation type comprises an inner resource allocation or an outer resource allocation.

Aspect 22: The method of any of aspects 12 through 21, wherein the uplink muting pattern is associated with cross-link interference mitigation for the network entity operating in a full duplex mode, and the set of uplink resources is associated with at least one full-duplex slot.

Aspect 23: A UE for wireless communications, comprising at least one processor and at least one memory coupled with the at least one processor, with instructions stored in the at least one memory. The instructions may be executable by the at least one processor, individually or in any combination, to cause the apparatus to perform a method of any of aspects 1 through 11.

Aspect 24: A UE for wireless communications, comprising at least one means for performing a method of any of aspects 1 through 11.

Aspect 25: A non-transitory computer-readable medium storing code for wireless communications, the code comprising instructions executable by a processor to perform a method of any of aspects 1 through 11.

Aspect 26: A network entity for wireless communications, comprising at least one processor, and at least one memory coupled with the at least one processor, with instructions stored in the at least one memory. The instructions may be executable by the at least one processor, individually or in any combination, to cause the apparatus to perform a method of any of aspects 12 through 22.

Aspect 27: A network entity for wireless communications, comprising at least one means for performing a method of any of aspects 12 through 22.

Aspect 28: A non-transitory computer-readable medium storing code for wireless communications, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
   at least one processor; and
   at least one memory coupled with the at least one processor, with instructions stored in the at least one memory, the instructions being executable by the at least one processor, individually or in any combination, to cause the UE to:
      receive control signaling indicating a configuration of an uplink muting pattern, the uplink muting pattern comprising one or more resources for which the UE mutes uplink transmissions;
      receive a message triggering transmission of one or more uplink signals via a set of uplink resources, wherein the set of uplink resources at least partially overlaps with the one or more resources of the uplink muting pattern; and
      transmit, via the set of uplink resources, the one or more uplink signals in accordance with the received message, wherein a threshold transmit power for transmitting the one or more uplink signals is based at least in part on a power reduction value associated with the uplink muting pattern.

2. The UE of claim 1, wherein the instructions are further executable by the at least one processor, individually or in any combination, to cause the UE to:
   calculate the threshold transmit power of the one or more uplink signals based at least in part on the power reduction value, wherein the power reduction value is associated with a set of uplink muting patterns that includes the uplink muting pattern.

3. The UE of claim 2, wherein the set of uplink muting patterns comprises at least one uplink muting pattern configured with one or more resource blocks as the one or more resources for which the UE mutes the uplink transmissions.

4. The UE of claim 2, wherein the set of uplink muting patterns comprises at least one uplink muting pattern configured with one or more REs as the one or more resources for which the UE mutes the uplink transmissions.

5. The UE of claim 2, wherein the set of uplink muting patterns comprises a subset of a plurality of uplink muting patterns.

6. The UE of claim 2, wherein each uplink muting pattern of the set of uplink muting patterns is associated with a respective power reduction value.

7. The UE of claim 1, wherein the instructions are further executable by the at least one processor, individually or in any combination, to cause the UE to:
   identify the power reduction value based at least in part on the uplink muting pattern, a waveform type associated with the one or more uplink signals, a modulation scheme associated with the one or more uplink signals, or any combination thereof.

8. The UE of claim 7, wherein the power reduction value is identified based at least in part on a lookup table that comprises a plurality of power reduction values associated with respective uplink muting patterns.

9. The UE of claim 1, wherein the instructions are further executable by the at least one processor, individually or in any combination, to cause the UE to:
   identify the power reduction value based at least in part on an allocation type of the set of uplink resources, wherein the allocation type comprises an inner resource allocation or an outer resource allocation.

10. The UE of claim 1, wherein the instructions are further executable by the at least one processor, individually or in any combination, to cause the UE to:
   identify the power reduction value based at least in part on the uplink muting pattern and an allocation type of the set of uplink resources, wherein the allocation type comprises an inner resource allocation or an outer resource allocation.

11. The UE of claim 1, wherein the uplink muting pattern is associated with cross-link interference mitigation for a network entity operating in a full duplex mode, and wherein the set of uplink resources is associated with at least one full-duplex slot.

12. A network entity for wireless communication, comprising:
at least one processor; and
at least one memory coupled with the at least one processor, with instructions stored in the at least one memory, the instructions being executable by the at least one processor, individually or in any combination, to cause the network entity to:
transmit control signaling indicating a configuration of an uplink muting pattern, the uplink muting pattern comprising one or more resources for which a user equipment (UE) mutes uplink transmissions;
transmit a message triggering transmission of one or more uplink signals via a set of uplink resources, wherein the set of uplink resources at least partially overlaps with the one or more resources of the uplink muting pattern; and
receive, via the set of uplink resources, the one or more uplink signals in accordance with the transmitted message, wherein a transmit power of at least one of the one or more uplink signals is based at least in part on a power reduction value associated with the uplink muting pattern.

13. The network entity of claim 12, wherein the power reduction value is associated with a set of uplink muting patterns that includes the uplink muting pattern.

14. The network entity of claim 13, wherein the set of uplink muting patterns comprises at least one uplink muting pattern configured with one or more resource blocks as the one or more resources for which the UE mutes the uplink transmissions.

15. The network entity of claim 13, wherein the set of uplink muting patterns comprises at least one uplink muting pattern configured with one or more resource elements as the one or more resources for which the UE mutes the uplink transmissions.

16. The network entity of claim 13, wherein the set of uplink muting patterns comprises a subset of a plurality of uplink muting patterns.

17. The network entity of claim 13, wherein each uplink muting pattern of the set of uplink muting patterns is associated with a respective power reduction value.

18. The network entity of claim 12, wherein the power reduction value is based at least in part on the uplink muting pattern, a waveform type associated with the one or more uplink signals, a modulation scheme associated with the one or more uplink signals, or any combination thereof.

19. The network entity of claim 12, wherein the power reduction value is based at least in part on a lookup table that comprises a plurality of power reduction values associated with respective uplink muting patterns.

20. The network entity of claim 12, wherein the power reduction value is based at least in part on an allocation type of the set of uplink resources, wherein the allocation type comprises an inner resource allocation or an outer resource allocation.

21. The network entity of claim 12, wherein the power reduction value is based at least in part on the uplink muting pattern and an allocation type of the set of uplink resources, wherein the allocation type comprises an inner resource allocation or an outer resource allocation.

22. The network entity of claim 12, wherein the uplink muting pattern is associated with cross-link interference mitigation for the network entity operating in a full duplex mode, and wherein the set of uplink resources is associated with at least one full-duplex slot.

23. A method for wireless communication at a user equipment (UE), comprising:
receiving control signaling indicating a configuration of an uplink muting pattern, the uplink muting pattern comprising one or more resources for which the UE mutes uplink transmissions;
receiving a message triggering transmission of one or more uplink signals via a set of uplink resources, wherein the set of uplink resources at least partially overlaps with the one or more resources of the uplink muting pattern; and
transmitting, via the set of uplink resources, the one or more uplink signals in accordance with the received message, wherein a threshold transmit power for transmitting the one or more uplink signals is based at least in part on a power reduction value associated with the uplink muting pattern.

24. The method of claim 23, further comprising:
calculating the threshold transmit power of the one or more uplink signals based at least in part on the power reduction value, wherein the power reduction value is associated with a set of uplink muting patterns that includes the uplink muting pattern.

25. The method of claim 23, further comprising:
identifying the power reduction value based at least in part on the uplink muting pattern, a waveform type associated with the one or more uplink signals, a modulation scheme associated with the one or more uplink signals, or any combination thereof.

26. The method of claim 23, further comprising:
identifying the power reduction value based at least in part on the uplink muting pattern and an allocation type of the set of uplink resources, wherein the allocation type comprises an inner resource allocation or an outer resource allocation.

27. A method for wireless communication at a network entity, comprising:
transmitting control signaling indicating a configuration of an uplink muting pattern, the uplink muting pattern comprising one or more resources for which a user equipment (UE) mutes uplink transmissions;
transmitting a message triggering transmission of one or more uplink signals via a set of uplink resources, wherein the set of uplink resources at least partially overlaps with the one or more resources of the uplink muting pattern; and
receiving, via the set of uplink resources, the one or more uplink signals in accordance with the transmitted message, wherein a transmit power of at least one of the one or more uplink signals is based at least in part on a power reduction value associated with the uplink muting pattern.

28. The method of claim 27, wherein the power reduction value is associated with a set of uplink muting patterns that includes the uplink muting pattern.

29. The method of claim 28, wherein the set of uplink muting patterns comprises at least one uplink muting pattern configured with one or more resource blocks as the one or more resources for which the UE mutes the uplink transmissions.

30. The method of claim 28, wherein the set of uplink muting patterns comprises at least one uplink muting pattern configured with one or more resource elements as the one or more resources for which the UE mutes the uplink transmissions.

* * * * *